US012676120B2

(12) United States Patent
Choi et al.

(10) Patent No.: US 12,676,120 B2
(45) Date of Patent: Jul. 7, 2026

(54) DISPLAY DEVICE

(71) Applicant: Samsung Display Co., Ltd., Yongin-si (KR)

(72) Inventors: Jun Won Choi, Yongin-si (KR); Jae Won Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/944,799

(22) Filed: Nov. 12, 2024

(65) Prior Publication Data

US 2025/0069557 A1 Feb. 27, 2025

Related U.S. Application Data

(63) Continuation of application No. 18/108,800, filed on Feb. 13, 2023, now Pat. No. 12,142,225.

(30) Foreign Application Priority Data

Apr. 8, 2022 (KR) ........................ 10-2022-0043733

(51) Int. Cl.

| | |
|---|---|
| ***G09G 3/32*** | (2016.01) |
| ***G09G 3/3233*** | (2016.01) |
| ***G09G 3/3266*** | (2016.01) |
| ***G09G 3/3291*** | (2016.01) |

(52) U.S. Cl.

CPC ......... *G09G 3/3266* (2013.01); *G09G 3/3233* (2013.01); *G09G 3/3291* (2013.01); *G09G 2300/0426* (2013.01); *G09G 2310/0278* (2013.01); *G09G 2320/0233* (2013.01)

(58) Field of Classification Search

CPC ............................... G09G 3/32; H10K 59/131

See application file for complete search history.

(56) References Cited

U.S. PATENT DOCUMENTS

| | | | | |
|---|---|---|---|---|
| 2009/0046041 | A1 * | 2/2009 | Tanikame ............ | H10K 59/131 345/76 |
| 2018/0114824 | A1 * | 4/2018 | Lee ...................... | H10K 59/122 |
| 2019/0304373 | A1 | 10/2019 | Wang et al. | |
| 2020/0403059 | A1 | 12/2020 | Oh et al. | |

FOREIGN PATENT DOCUMENTS

| | | |
|---|---|---|
| KR | 10-2011-0039773 | 4/2011 |
| KR | 10-2018-0089928 | 8/2018 |
| KR | 10-2019-0066205 | 6/2019 |
| KR | 10-2020-0139297 | 12/2020 |

* cited by examiner

*Primary Examiner* — Joseph R Haley

(74) *Attorney, Agent, or Firm* — F. CHAU & ASSOCIATES, LLC

(57) ABSTRACT

A display device comprising a scan write line to which a scan write signal is applied, a data line to which a data voltage is applied, and a pixel electrically connected to the scan write line and the data line. The pixel comprises a light emitting element, a driving transistor that provides a driving current to the light emitting element according to a voltage of a gate electrode, a first transistor that supplies a data voltage of the data line to a first electrode of the driving transistor according to the scan write signal of the scan write line, a first connection electrode electrically connected to a gate electrode of the driving transistor, a first gate connection electrode electrically connected to a gate electrode of the first transistor, and a second connection electrode that electrically connects the scan write line to the first gate connection electrode.

30 Claims, 22 Drawing Sheets

GTL1: GIL, GBE1, GBE2, DT_G, EM

GTL2: CE22, GWL, VIL

DTL: DL, VDDL2, BE1, BE2, BE3, BE4, ANDE

GTL1: G1, DT_G1, G6
GTL2: CE22
DTL: DL, DT_G2, ANDE
TFTL: BF, ACT1, GTL1, GTL2, DTL, 130, 141, 142, 150, 160

GTL1: G1, DT_G1, G6
GTL2: CE2
DTL1: DT_G2, ANDE
DTL2: DL

DISPLAY DEVICE

CROSS-REFERENCE TO RELATED APPLICATION(S)

This is a continuation application of U.S. patent application Ser. No. 18/108,800 filed Feb. 13, 2023 (now pending), the disclosure of which is incorporated herein by reference in its entirety. U.S. patent application Ser. No. 18/108,800 claims priority to and benefits of Korean Patent Application No. 10-2022-0043733 under 35 U.S.C. 119, filed on Apr. 8, 2022 in the Korean Intellectual Property Office, the entire contents of which are herein incorporated by reference.

BACKGROUND

1. Technical Field

The disclosure relates to a display device.

2. Description of the Related Art

With the advance of information-oriented society, more and more demands are placed on display devices for displaying images in various ways. A display device may be a flat panel display device such as a liquid crystal display, a field emission display and a light emitting display. A light emitting display device may include an organic light emitting display device including an organic light emitting diode element as a light emitting element, an inorganic light emitting display device including an inorganic semiconductor element as a light emitting element, or a micro light emitting display device including an ultra-small light emitting diode element (or micro light emitting diode element) as a light emitting element.

The display device may include pixels, and each of the pixels may include a light emitting element, a driving transistor for controlling the amount of the driving current supplied to the light emitting element based on the voltage of a gate electrode, and a scan transistor for supplying the data voltage of a data line to the gate electrode of the driving transistor in response to the scan signal of a scan line.

In each of the pixels, a parasitic capacitance may exist between the gate electrode of the driving transistor and the scan line. Due to the parasitic capacitance, the pixels may be different from each other in the luminance of the light emitting element, and accordingly, the image quality viewed by the user may be deteriorated.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device capable of preventing deterioration of image quality.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment of the disclosure, a display device may include a scan write line to which a scan write signal may be applied, a data line to which a data voltage may be applied, and a pixel electrically connected to the scan write line and the data line. The pixel may include a light emitting element, a driving transistor that provides a driving current to the light emitting element according to a voltage of a gate electrode, a first transistor that supplies a data voltage of the data line to a first electrode of the driving transistor according to the scan write signal of the scan write line, a first connection electrode electrically connected to a gate electrode of the driving transistor, a first gate connection electrode electrically connected to a gate electrode of the first transistor, and a second connection electrode that electrically connects the scan write line to the first gate connection electrode.

The scan write line and the first connection electrode may do not overlap each other, and the first gate connection electrode and the first connection electrode may do not overlap each other.

The second connection electrode and the first connection electrode may include a same material.

The scan write line may extend in a first direction, and the data line, the first connection electrode, and the second connection electrode may each extend in a second direction crossing the first direction.

The first gate connection electrode may extend in the first direction.

The first gate connection electrode may do not overlap the data line.

The display device may further include an initialization voltage line to which an initialization voltage may be applied. The pixel may further include a second transistor that supplies the initialization voltage of the initialization voltage line to a second electrode of the driving transistor according to the scan write signal of the scan write line, a second gate connection electrode electrically connected to a gate electrode of the second transistor, and a third connection electrode that electrically connects the scan write line to the second gate connection electrode.

The third connection electrode and the first connection electrode may include a same material.

The scan write line may extend in a first direction, and the data line, the first connection electrode, the second connection electrode, and the third connection electrode may each extend in a second direction crossing the first direction.

The second gate connection electrode may do not overlap the data line.

The display device may further include a scan initialization line to which a scan initialization signal may be applied, and an initialization voltage line to which an initialization voltage may be applied. The scan write line may be disposed between the scan initialization line and the initialization voltage line.

The display device may further include a scan control line to which a scan control signal may be applied, and an initialization voltage line to which an initialization voltage may be applied. The pixel may further include a second transistor that supplies the initialization voltage of the initialization voltage line to a second electrode of the driving transistor according to the scan control signal of the scan control line, a second gate connection electrode electrically connected to a gate electrode of the second transistor, and a third connection electrode that electrically connects the scan control line to the second gate connection electrode.

The scan control signal may be disposed between the scan write line and the initialization voltage line.

According to another embodiment of the disclosure, a display device may include a substrate, an active layer comprising a first channel of a first transistor disposed on the substrate, a gate insulating layer disposed on the active layer, a first gate connection electrode disposed on the gate insulating layer to overlap the first channel of the first transistor, a first interlayer insulating layer disposed on the first gate connection electrode, a scan write line disposed on the first interlayer insulating layer, a second interlayer insulating layer disposed on the scan write line, and a first connection electrode and a second connection electrode that are disposed on the second interlayer insulating layer. The second connection electrode may be electrically connected to the scan write line through a first contact hole penetrating the second interlayer insulating layer, and the second connection electrode may be electrically connected to the first gate connection electrode through a second contact hole penetrating the first interlayer insulating layer and the second interlayer insulating layer.

The display device may further include a second channel of a driving transistor disposed on the substrate, a gate electrode of the driving transistor overlapping a second channel of the driving transistor disposed on the gate insulating layer, and a capacitor electrode disposed on the first interlayer insulating layer to overlap the gate electrode of the driving transistor. The scan write line and the capacitor electrode may include a same material.

The display device further comprising, a second channel of a second transistor disposed on the substrate, a second gate connection electrode disposed on the gate insulating layer to overlap the second channel of the second transistor, and a third connection electrode disposed on the second interlayer insulating layer.

The third connection electrode may be electrically connected to the scan write line through a third contact hole penetrating the second interlayer insulating layer, and the third connection electrode may be electrically connected to the second gate connection electrode through a fourth contact hole penetrating the first interlayer insulating layer and the second interlayer insulating layer.

According to another embodiment of the disclosure, a display device may include a substrate, an active layer comprising a first channel of a first transistor disposed on the substrate, a gate insulating layer disposed on the active layer, a first gate connection electrode disposed on the gate insulating layer to overlap the first channel of the first transistor, a first interlayer insulating layer disposed on the first gate connection electrode, a scan initialization line disposed on the first interlayer insulating layer, a second interlayer insulating layer disposed on the scan initialization line, and a scan write line, a first connection electrode, and a second connection electrode that are disposed on the second interlayer insulating layer. The second connection electrode may be electrically connected to the scan write line. The second connection electrode may be electrically connected to the first gate connection electrode through a contact hole penetrating the first interlayer insulating layer and the second interlayer insulating layer. The display device may further include a third interlayer insulating layer disposed on the scan write line, the first connection electrode, and the second connection electrode, and a data line disposed on the third interlayer insulating layer.

The display device may further include a second channel of a second transistor disposed on the substrate, a second gate connection electrode disposed on the gate insulating layer to overlap a second channel of the second transistor, and a third connection electrode disposed on the second interlayer insulating layer.

The third connection electrode may be electrically connected to the scan write line, and the third connection electrode may be electrically connected to the second gate connection electrode through another contact hole penetrating the first interlayer insulating layer and the second interlayer insulating layer.

In accordance with the display device according to embodiments, by preventing a parasitic capacitance that may occur between a gate electrode of a driving transistor and a scan line, it may be possible to prevent a kickback voltage due to the parasitic capacitance from affecting the gate electrode of the driving transistor. Accordingly, the luminance of light emitting elements may be uniformly maintained among multiple pixels, so that deterioration of image quality can be prevented.

However, the effects of the disclosure are not limited to the aforementioned effects, and various other effects are included in the disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well, unless the context clearly indicates otherwise.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

It will be understood that the terms "connected to" or "coupled to" may include a physical or electrical connection or coupling.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or to "not overlap" another element, this may include that the elements are spaced apart from each other, offset from each other, or set aside from each other or any other suitable term as would be appreciated and understood by those of ordinary skill in the art.

In the specification and the claims, the phrase "at least one of" is intended to include the meaning of "at least one selected from the group of" for the purpose of its meaning and interpretation. For example, "at least one of A and B" may be understood to mean any combination including "A, B, or A and B."

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
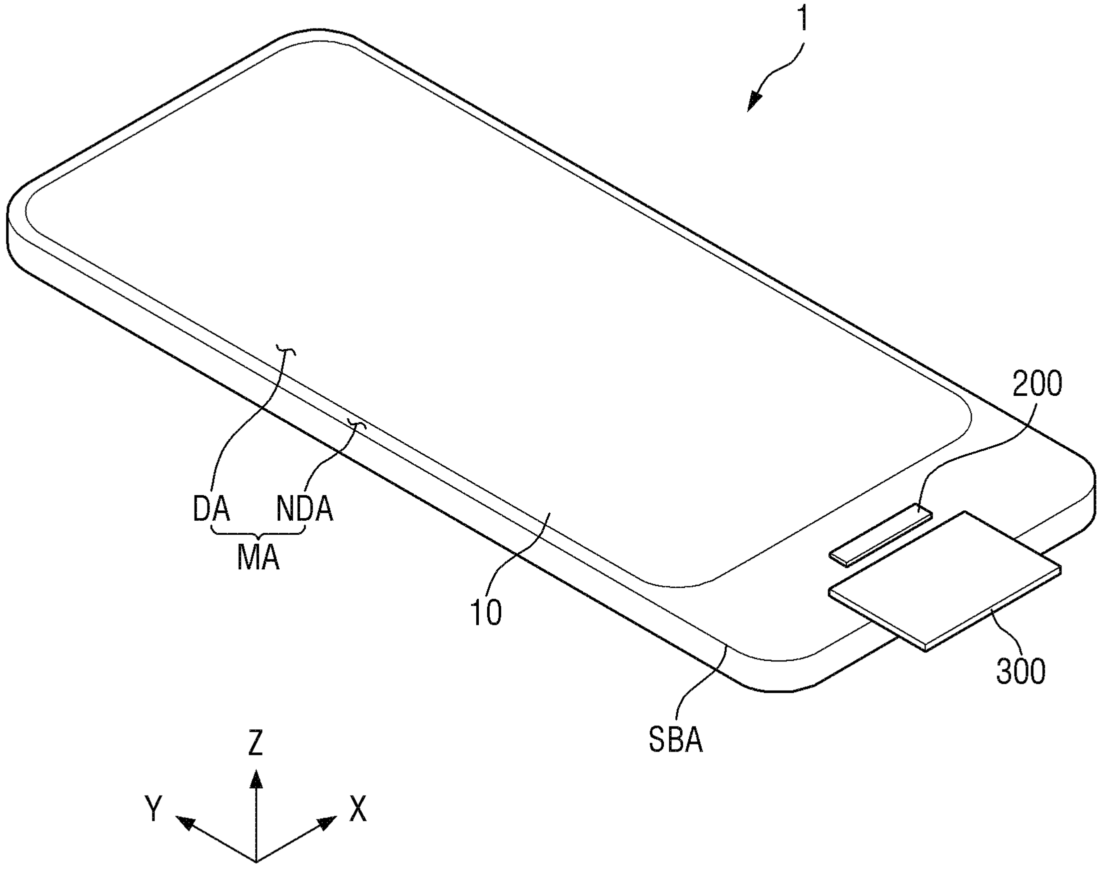
FIG. 1 is a schematic perspective view illustrating a display device according to an embodiment.

FIG. 1 is a schematic perspective view illustrating a display device according to an embodiment.

Referring to FIG. 1, a display device 1 is a device for displaying a moving image or a still image. The display device 1 may be used as a display screen of various devices, such as a television, a laptop computer, a monitor, a billboard, and an Internet-of-Things (IOT) device, as well as portable electronic devices such as a mobile phone, a smartphone, a tablet personal computer (PC), a smart watch, a watch phone, a mobile communication terminal, an electronic notebook, an electronic book, a portable multimedia player (PMP), a navigation device and an ultra-mobile PC (UMPC).

The display device 1 may be a light emitting display device such as an organic light emitting display using an organic light emitting diode, a quantum dot light emitting display including a quantum dot light emitting layer, an inorganic light emitting display including an inorganic semiconductor, or a micro light emitting display using a micro or nano light emitting diode (LED). In the following description, it is assumed that the display device 1 is an organic light emitting display device, but the disclosure is not limited thereto.

The display device 1 may include a display panel 10, a display driving circuit 200, and a circuit board 300.

The display panel 10 may, in plan view, be formed in a rectangular shape having short sides in a first direction X and long sides in a second direction Y crossing the first direction X. A corner where the short side in the first direction X and the long side in the second direction Y meet may be right-angled or rounded to have a predetermined or selectable curvature. The planar shape of the display panel 10 is not limited to the rectangular shape, and may be formed in another polygonal shape, a circular shape or an elliptical shape. The display panel 10 may be formed to be flat, but is not limited thereto. For example, the display panel 10 may include a curved portion formed at left and right ends and having a predetermined or selectable curvature or a varying curvature. The display panel 10 may be formed flexibly so that it can be curved, bent, folded, and/or rolled.

A substrate of the display panel 10 may include a main region MA and a sub-region SBA.

The main region MA may include a display area DA displaying an image and a non-display area NDA that may be a peripheral area of the display area DA.

The display area DA may include display pixels for displaying an image. Further, the display area DA may include light sensing pixels that not only display an image, but also sense light to detect a user's fingerprint. The display area DA may occupy most of the main region MA. The display area DA may be disposed at the center of the main region MA.

The non-display area NDA may be disposed adjacent to the display area DA. The non-display area NDA may be an area outside the display area DA. The non-display area NDA may be disposed to surround the display area DA. The non-display area NDA may be an edge area of the display panel 10.

The sub-region SBA may protrude from a side of the main region MA in the second direction Y. The length of the sub-region SBA in the second direction Y may be less than the length of the main region MA in the second direction Y. The length of the sub-region SBA in the first direction X may be substantially equal to or less than the length of the main region MA in the first direction X.

FIG. 1 illustrates that the sub-region SBA is unfolded, but the sub-region SBA may be bent. The sub-region SBA may be arranged below the main region MA, and thus it may overlap the main region MA in a third direction Z.

The display driving circuit 200 may generate signals and voltages for driving the display panel 10. The display driving circuit 200 may be formed as an integrated circuit (IC) and attached to the sub-region SBA of the display panel 10 by a chip on glass (COG) method, a chip on plastic (COP) method, or an ultrasonic bonding method, but the disclosure is not limited thereto. For example, the display driving circuit 200 may be attached onto the circuit board 300 by a chip on film (COF) method.

The circuit board 300 may be attached to an end of the sub-region SBA of the display panel 10. Thus, the circuit board 300 may be electrically connected to the display panel 10 and the display driving circuit 200. The display panel 10 and the display driving circuit 200 may receive digital video data, timing signals, and driving voltages through the circuit board 300. The circuit board 300 may be a flexible printed circuit board, a printed circuit board, or a flexible film such as a chip on film.

Figure 2:
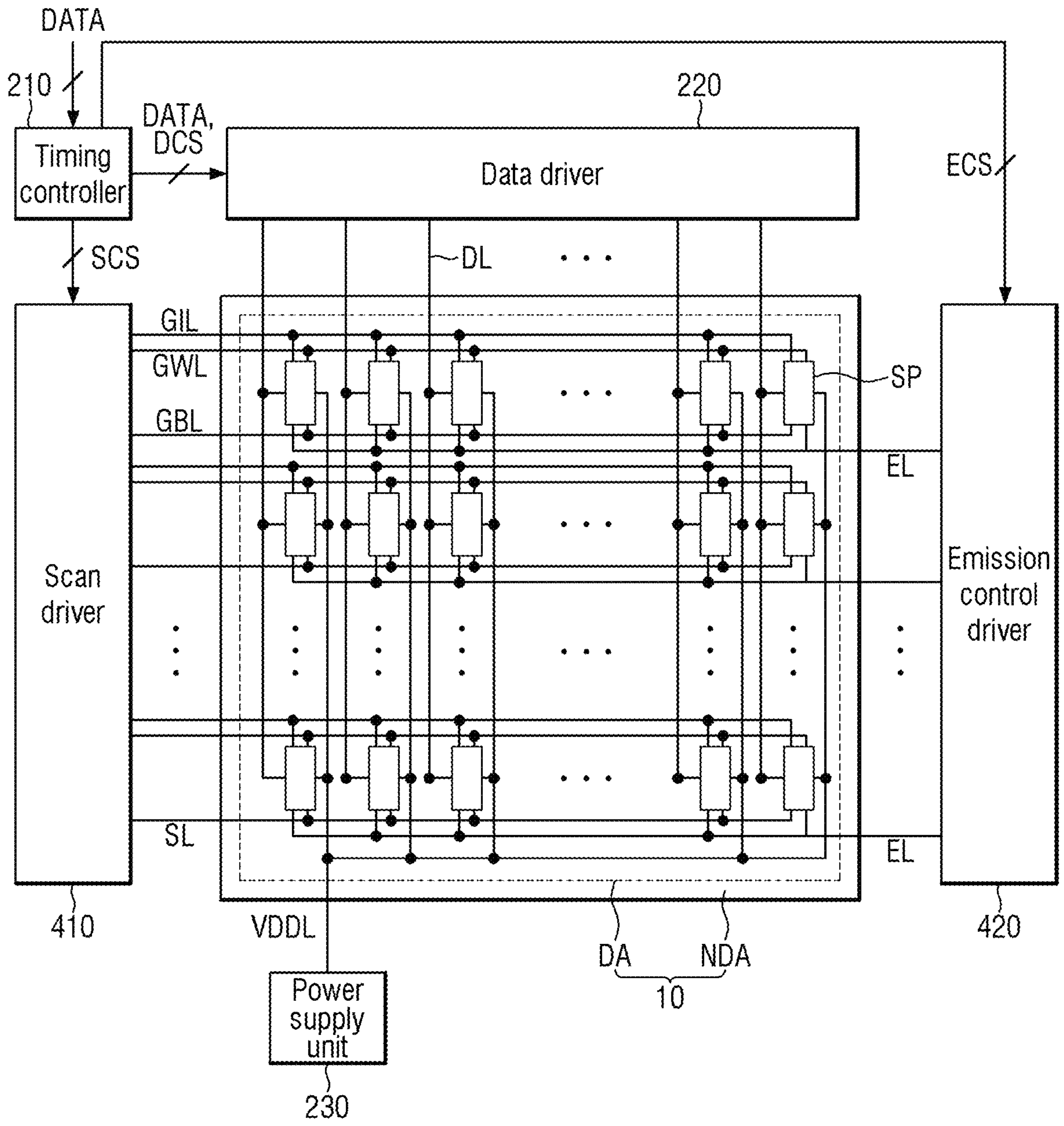
FIG. 2 is a schematic block diagram illustrating a display device according to an embodiment.

FIG. 2 is a schematic block diagram illustrating a display device according to an embodiment.

Referring to FIG. 2, the display device according to an embodiment may include the display panel 10, a scan driver 410, an emission driver 420, the display driving circuit 200, and a power supply unit 230. The display driving circuit 200 may include a data driver 220 and a timing controller 210.

The display panel 10 may include a sub-pixel SP, scan write lines GWL, scan initialization lines GIL, scan bias lines GBL, emission lines EL, and data lines DL that may be disposed in the display area DA. The display panel 10 may further include the scan driver 410 and the emission driver 420 disposed in the non-display area NDA.

The scan write lines GWL, the scan initialization lines GIL, the scan bias lines GBL, and the emission lines EL may extend in the first direction X. The data lines DL may extend in the second direction Y.

The sub-pixel SP may be disposed in the display area DA. Each of the sub-pixels SP may be connected to any one of the scan write lines GWL, any one of the scan initialization lines GIL, any one of the scan bias lines GBL, any one of the emission lines EL, and any one of the data lines DL. Since each of the sub-pixels SP may be controlled by a scan write signal of the scan write line GWL, a scan initialization signal of the scan initialization line GIL, a scan bias signal of the scan bias line GBL, and an emission signal of the emission line EL, the sub-pixel may receive a data voltage of the data line DL and apply a driving current to the light emitting element according to the data voltage, thereby emitting light.

The scan driver 410 may be connected to the scan write lines GWL, the scan initialization lines GIL, and the scan bias lines GBL. The scan driver 410 may receive a scan control signal SCS from the timing controller 210. The scan control signal SCS may include first to fourth scan control signals. The scan driver 410 may generate the scan write signals according to a first scan control signal and output them to the scan write lines GWL. Further, the scan driver 410 may generate the scan initialization signals according to a second scan control signal and output them to the scan initialization lines GIL. Furthermore, the scan driver 410 may generate the scan bias signals according to a third scan control signal and output them to the scan bias lines GBL.

The emission driver 420 may be connected to the emission lines EL. The emission driver 420 may receive an emission control signal ECS from the timing controller 210. The emission driver 420 may generate emission signals according to the emission control signal ECS and output them to the emission lines EL.

The data driver 220 converts digital video data DATA into data voltages and outputs them to the data lines DL. The data driver 220 may output the data voltages in synchronization with the scan write signals. Therefore, the sub-pixels SP may be selected by the scan write signals of the scan driver 410, and the data voltage may be supplied to each of the selected sub-pixels SP.

The timing controller 210 may receive the timing signals and the digital video data DATA from an external graphic device. For example, the external graphic device may be a graphic card of a computer, a set-top box, an application processor of a smartphone or a mobile phone, and the like, but embodiments of the disclosure are not limited thereto.

The timing controller 210 may generate the scan control signal SCS and the emission control signal ECS to control the operation timing of the scan driver 410 according to timing signals. The timing controller 210 may generate a data control signal DCS for controlling the operation timing of the data driver 220 according to the timing signals.

The timing controller 210 may output the scan control signal SCS to the scan driver 410 and output the emission control signal ECS to the emission driver 420. The timing controller 210 may output the digital video data DATA and the data control signal DCS to the data driver 220.

The power supply unit 230 may generate driving voltages and output them to the display panel 10. The power supply unit 230 may output a first power voltage, a second power voltage, a first initialization voltage, and a second initialization voltage to the display panel 10. The first power voltage VDD may be a high potential driving voltage, and the second power voltage VSS may be a low potential driving voltage.

Figure 3:
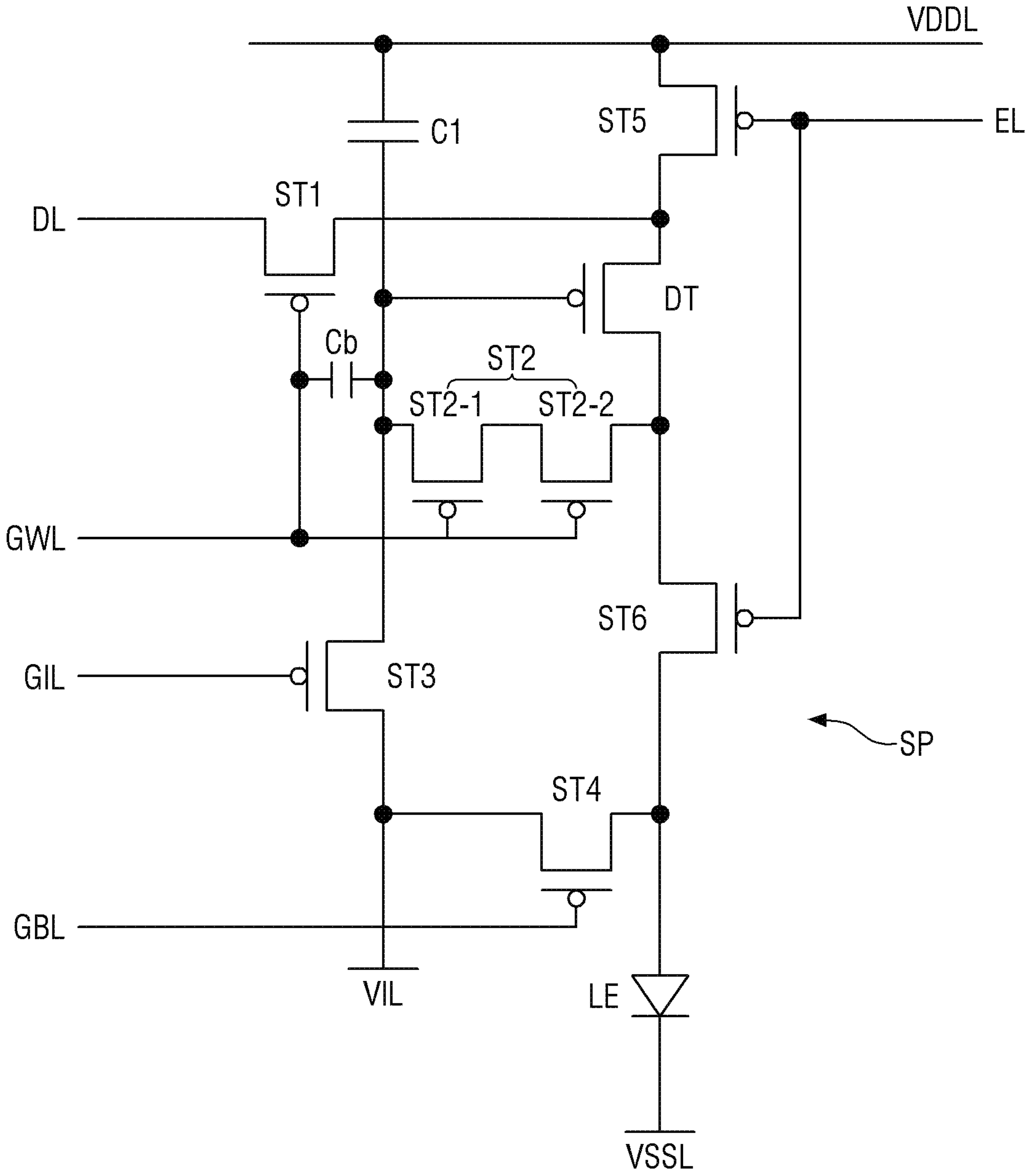
FIG. 3 is a schematic circuit diagram illustrating a sub-pixel according to an embodiment.

FIG. 3 is a schematic circuit diagram illustrating a sub-pixel according to an embodiment.

Referring to FIG. 3, the sub-pixel SP may include a pixel driver. The pixel driver may include a driving transistor DT, first to sixth transistors ST1 to ST6, and a first capacitor CL.

The driving transistor DT may control the driving current according to the data voltage applied to the gate electrode thereof.

The first transistor ST1 may be turned on by the scan signal of the scan write line GWL to supply the data voltage of the data line DL to a first electrode of the driving transistor DT. The second transistor ST2 may be turned on by the scan signal of the scan write line GWL to connect the gate electrode and a second electrode of the driving transistor DT to each other. The third transistor ST3 may be turned on by the scan signal of the scan initialization line GIL to connect the gate electrode of the driving transistor DT to the initialization voltage line VIL. The fourth transistor ST4 may be turned on by the scan signal of the scan bias line GBL to connect an anode electrode of a light emitting element LE to the initialization voltage line VIL. The fifth transistor ST5 may be turned on by the emission control signal of the emission line EL to connect the first electrode of the driving transistor DT to a first driving voltage line VDDL. The sixth transistor ST6 may be connected between the second electrode of the driving transistor DT and the anode electrode of the light emitting element LE. The first capacitor C1 may be disposed between the second electrode of the driving transistor DT and the first driving voltage line VDDL.

The light emitting element LE may be disposed between the first electrode of the fourth transistor ST4 and a second driving voltage line VSSL.

In FIG. 3, each of the driving transistor DT and the first to sixth transistors ST1 to ST6 has a first electrode and a second electrode, one of which may be a source electrode, and the other of which may be a drain electrode. Further, although FIG. 3 illustrates that each of the driving transistor DT and the first to sixth transistors ST1 to ST6 may be formed as a P-type MOSFET, embodiments of the disclosure are not limited thereto. For example, each of the first to sixth transistors T1 to T6 may be formed as an N-type MOSFET.

Figure 4:
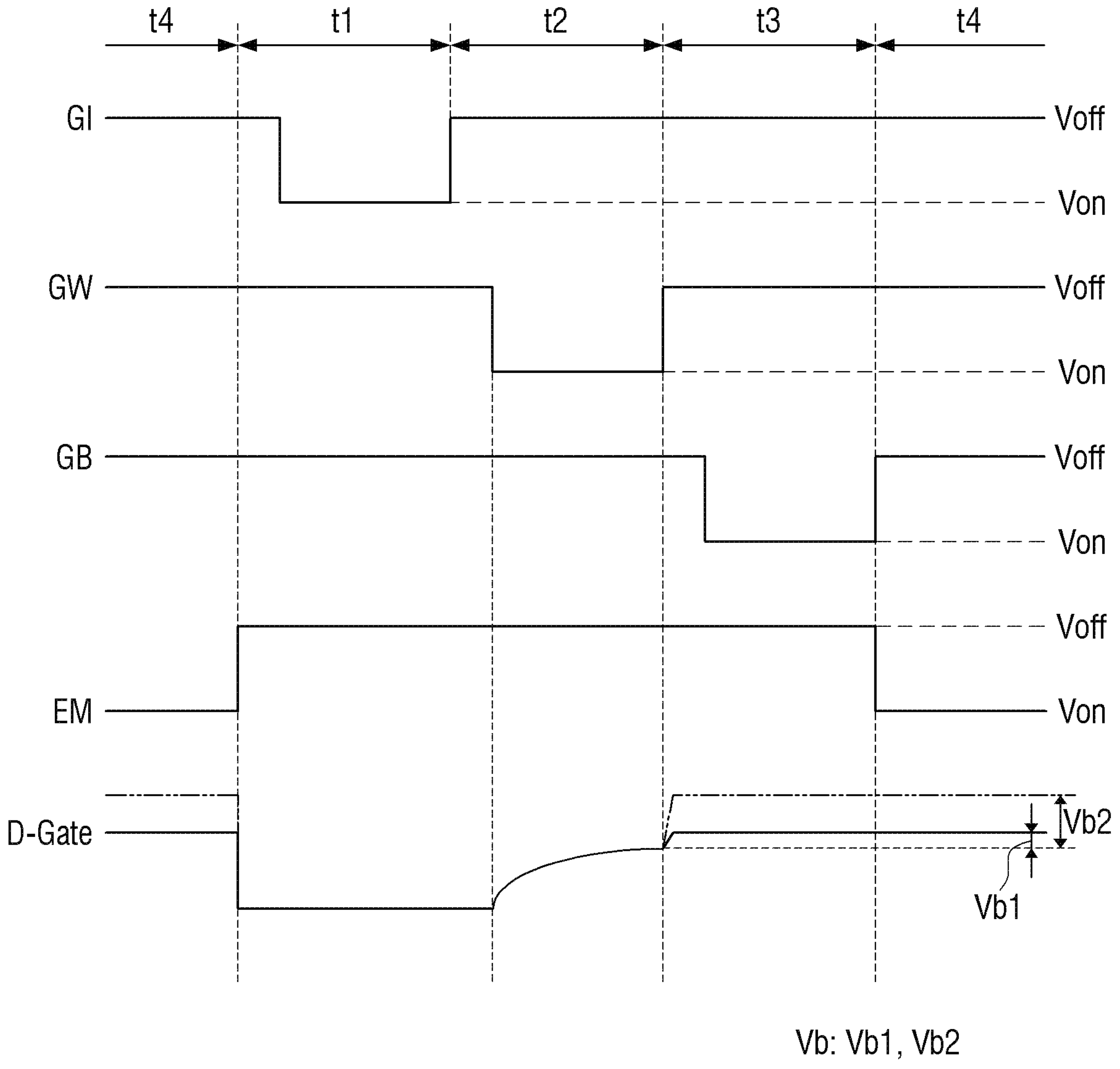
FIG. 4 is a schematic waveform diagram illustrating signals applied to the scan initialization line, the scan write line, the scan bias line, and the emission line of FIG. 3.
Figure 5:
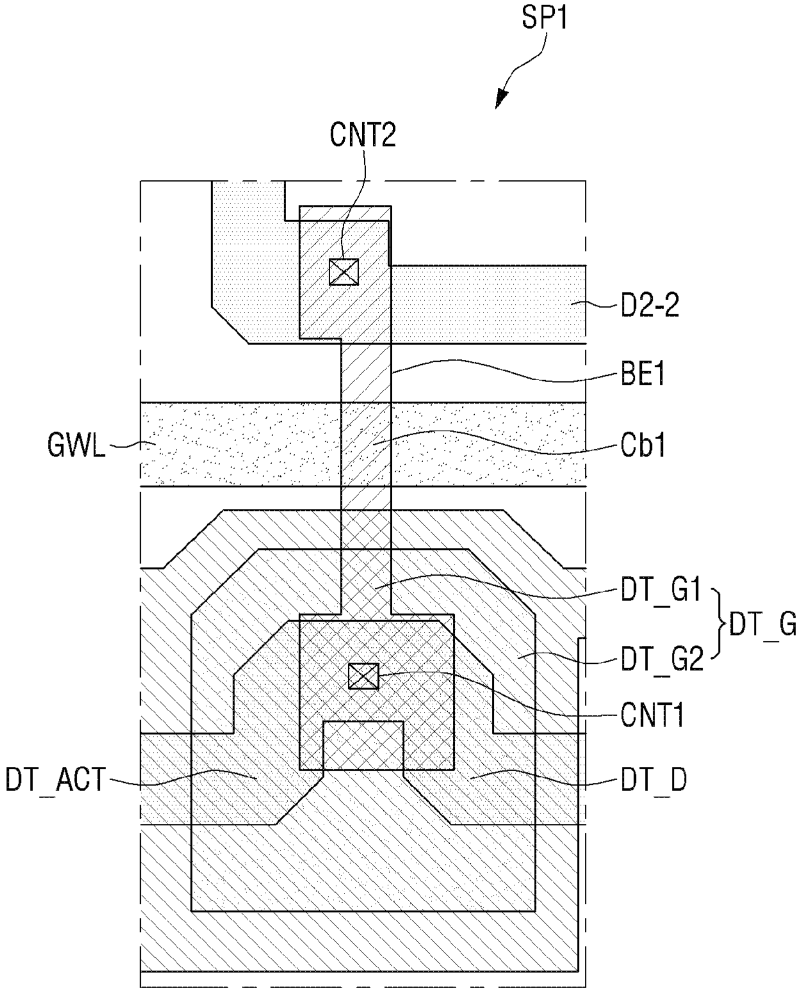
FIGS. 5 and 6 are schematic plan views illustrating sub-pixels in detail according to an embodiment.
Figure 6:
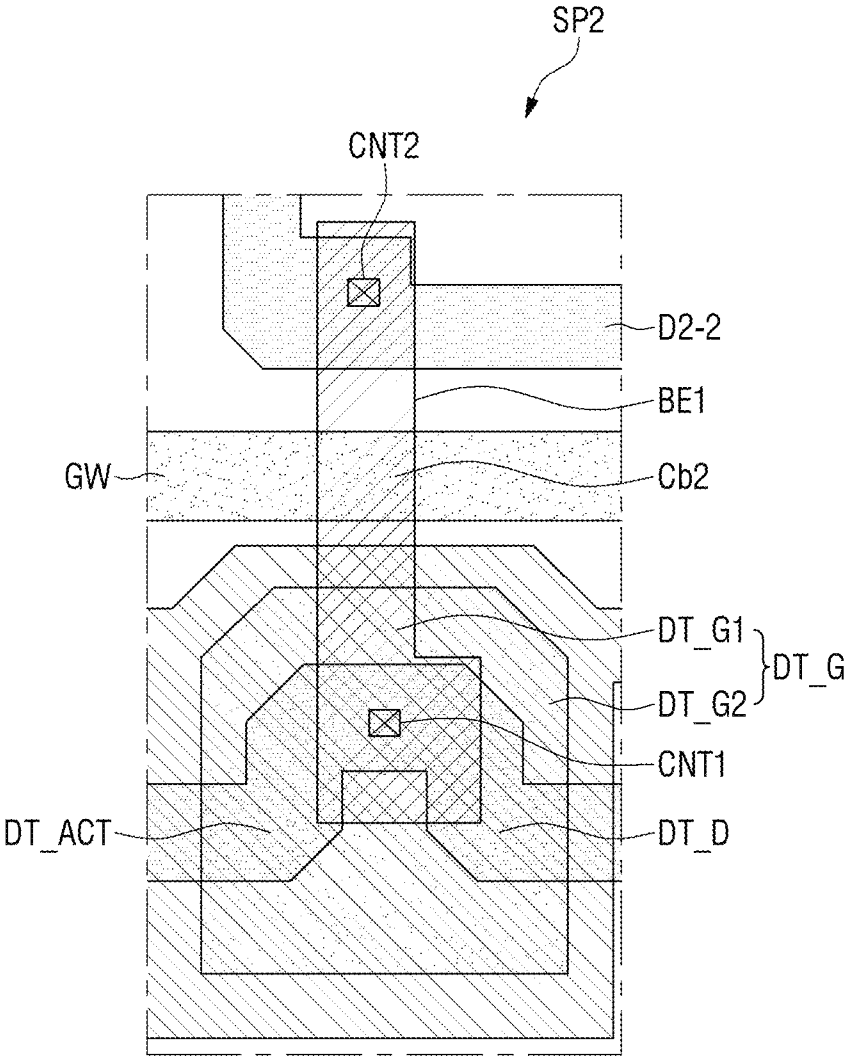

FIG. 4 is a schematic waveform diagram illustrating signals applied to the scan initialization line, the scan write line, the scan bias line, and the emission line of FIG. 3. FIGS. 5 and 6 are schematic plan views illustrating sub-pixels in detail according to an embodiment.

Referring to FIGS. 4 to 6, a scan initialization signal G1 applied to the scan initialization line GIL may be a signal for controlling turn-on and turn-off of the third transistor ST3. A scan write signal GW applied to the scan write line GWL may be a signal for controlling turn-on and turn-off of each of the first transistor ST1 and the second transistor ST2. A scan bias signal GB applied to the scan bias line GBL may be a signal for controlling turn-on and turn-off of the fourth transistor ST4. An emission signal EM may be a signal for controlling the fifth transistor ST5 and the sixth transistor ST6.

The scan initialization signal G1, the scan write signal GW, the scan bias signal GB, and the emission signal EM may be generated at the interval of one frame period. One frame period may be divided into first to fourth periods t1 to t4. The first period t1 refers to a period during which the gate electrode of the driving transistor DT may be initialized. The second period t2 refers to a period during which the data voltage and the threshold voltage of the driving transistor DT may be sampled at the gate electrode of the driving transistor DT. The third period t3 refers to a period during which the anode electrode of the light emitting element LE may be initialized. The fourth period t4 refers to a period during which light may be emitted from the light emitting element LE.

A parasitic capacitance Cb may exist between a gate electrode DT_G of the driving transistor DT and the scan write line GWL. A kickback voltage Vb (Vb1, Vb2) due to the parasitic capacitance Cb may affect the gate electrode DT_G of the driving transistor DT.

Specifically, during the second period t2, a difference voltage Vdata-Vth between a data voltage Vdata and a threshold voltage Vth of the driving transistor DT may be sampled at the gate electrode DT_G of the driving transistor DT. At this time, in case that the scan write signal GW falls from a gate-off voltage Voff to a gate-on voltage Von, the voltage D-Gate of the gate electrode DT_G of the driving transistor DT may rise by the kickback voltage Vb2 due to the parasitic capacitance Cb.

The kickback voltage Vb due to the parasitic capacitance Cb may be proportional to an overlapping area between the gate electrode DT_G of the driving transistor DT and the scan write line GWL. FIG. 5 illustrates a first parasitic capacitance Cb1 in which an overlapping area between the scan write line and a first connection electrode BE1 connected to the gate electrode DT_G of the driving transistor DT is a first area. FIG. 6 illustrates a second parasitic capacitance Cb2 in which an overlapping area between the first connection electrode BE1 and the scan write line GWL is a second area. The second area may be larger than the first area, and, the second parasitic capacitance Cb2 may be greater than the first parasitic capacitance Cb1.

Since the voltage D-Gate of the gate electrode DT_G of the driving transistor DT may vary for each sub-pixel SP due to the parasitic capacitance Cb, even if the same data voltage is applied to each sub-pixel SP, the light emitting elements LE may emit light that are different in luminance. The user may visually recognize the image non-uniformity, and thus the image quality may deteriorate.

Figure 7:
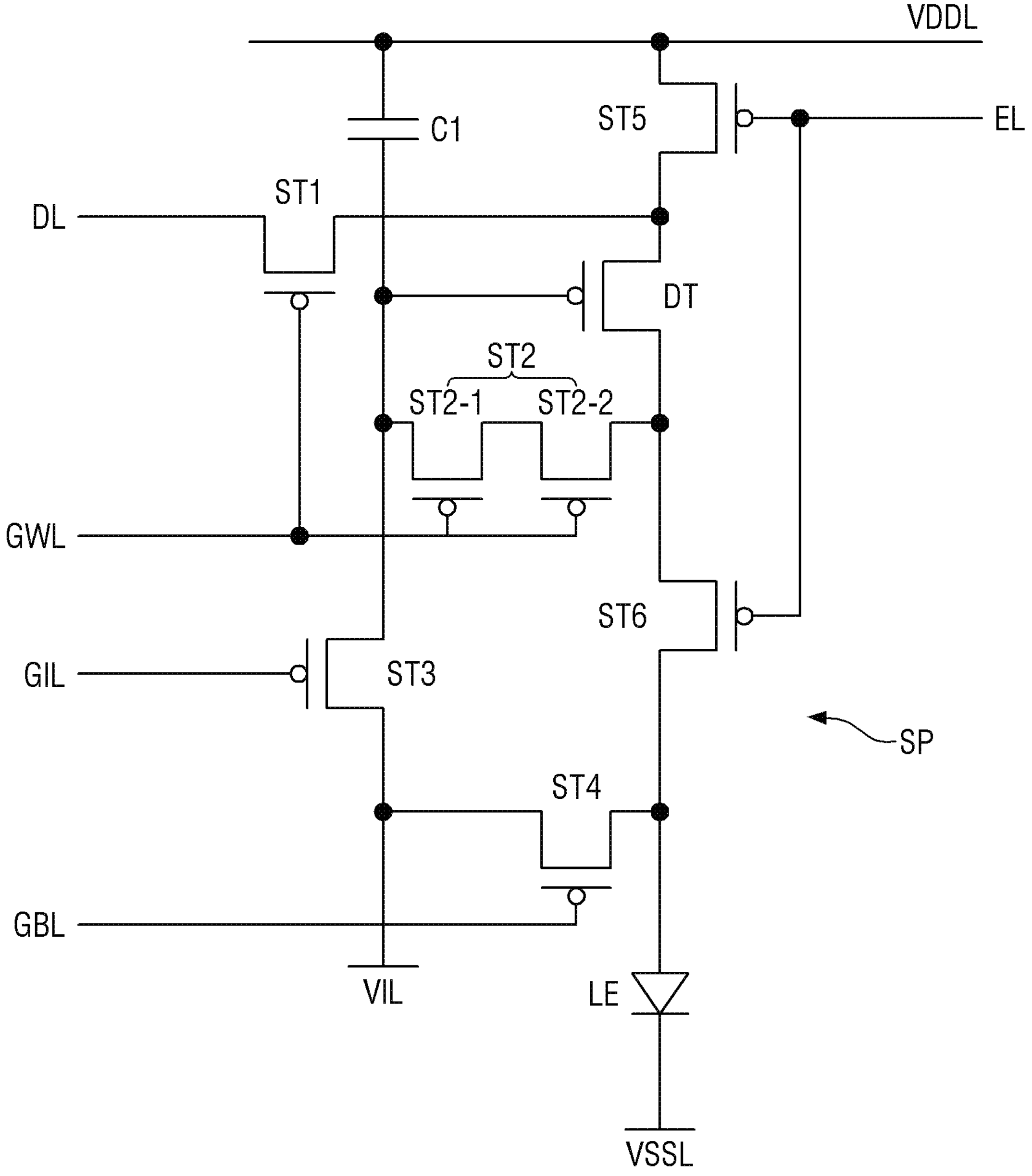
FIG. 7 is a schematic circuit diagram illustrating a sub-pixel in detail according to another embodiment.

FIG. 7 is a schematic circuit diagram illustrating a sub-pixel in detail according to another embodiment.

Referring to FIG. 7, the sub-pixel SP may be connected to the scan initialization line GIL, the scan write line GWL, the scan bias line GBL, and the data line DL. The sub-pixel SP may be connected to the first driving voltage line VDDL to which a first driving voltage may be supplied, an initialization voltage line VIL to which an initialization voltage may be supplied, and the second driving voltage line VSSL to which a second driving voltage may be supplied.

The sub-pixel SP may include the driving transistor DT, the light emitting element LE, the switch elements, the first capacitor C1, and the like. The switch elements may include the first to sixth transistors ST1, ST2, ST3, ST4, ST5, and ST6.

The driving transistor DT may control a drain-source current Ids (hereinafter, referred to as "driving current") based on a data voltage applied to the gate electrode. The driving current Ids flowing through the channel of the driving transistor DT may be proportional to the square of the difference between a gate-source voltage Vsg of the driving transistor DT and a threshold voltage as shown in Equation 1.

$$Ids = k' \times (Vsg - Vth)^2 \quad \text{[Equation 1]}$$

In Equation 1, k' may be a proportional coefficient determined by the structure and physical characteristics of the driving transistor, Vsg is a gate-source voltage of the driving transistor, and Vth is a threshold voltage of the driving transistor.

The light emitting element LE may emit light according to a driving current Ids. The emission amount of the light emitting element LE may be proportional to the driving current Ids.

The light emitting element LE may be an organic light emitting diode including an anode electrode, a cathode electrode, and an organic light emitting layer disposed between the anode electrode and the cathode electrode. In other embodiments, the light emitting element LE may be an inorganic light emitting element including an anode electrode, a cathode electrode, and an inorganic semiconductor disposed between the anode electrode and the cathode electrode.

In other embodiments, the light emitting element LE may be a quantum dot light emitting element including an anode electrode, a cathode electrode, and a quantum dot light emitting layer disposed between the anode electrode and the cathode electrode. In other embodiments, the light emitting element LE may be a micro light emitting diode.

The anode electrode of the light emitting element LE may be connected to a first electrode of the fourth transistor ST4 and a second electrode of the sixth transistor ST6, and the cathode electrode of the light emitting element LE may be connected to the second driving voltage line VSSL. A parasitic capacitance may be formed between the anode electrode and the cathode electrode of the light emitting element LE.

The first transistor ST1 maybe turned on by the scan signal of the scan write line GWL to connect the first electrode of the driving transistor DT to the data line DL.

The gate electrode of the first transistor ST1 may be connected to the scan write line GWL, the first electrode thereof may be connected to the first electrode of the driving transistor DT, and the second electrode thereof may be connected to the data line DL.

The second transistor ST2 may be formed as a dual transistor including a second-first transistor ST2-1 and a second-second transistor ST2-2. The second-first transistor ST2-1 and the second-second transistor ST2-2 are turned on by the scan signal of the scan write line GWL to connect the gate electrode and the second electrode of the driving transistor DT. For example, in case that the second-first transistor ST2-1 and the second-second transistor ST2-2 are turned on, since the gate electrode and the second electrode of the driving transistor DT are connected, the driving transistor DT acts as a diode. The gate electrode of the second-first transistor ST2-1 may be connected to the scan write line GWL, and the first electrode thereof may be connected to the second electrode of the second-second transistor ST2-2, and the second electrode thereof may be connected to the gate electrode of the driving transistor DT. The gate electrode of the second-second transistor ST2-2 may be connected to the scan write line GWL, the first electrode thereof may be connected to the second electrode of the driving transistor DT, and the second electrode thereof may be connected to the first electrode of the second-second transistor ST2-2.

The third transistor ST3 may be turned on by the scan signal of the scan initialization line GIL to connect the gate electrode of the driving transistor DT to the initialization voltage line VIL. The gate electrode of the driving transistor DT may be discharged to the initialization voltage of the initialization voltage line VIL. The gate electrode of the third transistor ST3 may be connected to the scan initialization line GIL, the first electrode thereof may be connected to the gate electrode of the driving transistor DT, and the second electrode thereof may be connected to the initialization voltage line VIL.

The fourth transistor ST4 may be turned on by the scan signal of the scan bias line GBL to connect the anode electrode of the light emitting element LE to the initialization voltage line VIL. The anode electrode of the light emitting element LE may be discharged to an initialization voltage. The gate electrode of the fourth transistor ST4 may be connected to the scan bias line GBL, the first electrode thereof may be connected to the anode electrode of the light emitting element LE, and the second electrode thereof may be connected to the initialization voltage line VIL.

The fifth transistor ST5 may be turned on by the emission control signal of the emission line EL to connect the first electrode of the driving transistor DT to the first driving voltage line VDDL. The gate electrode of the fifth transistor ST5 may be connected to the emission line EL, the first electrode thereof may be connected to the first driving voltage line VDDL, and the second electrode thereof may be connected to the source electrode of the driving transistor DT.

The sixth transistor ST6 may be connected between the second electrode of the driving transistor DT and the anode electrode of the light emitting element LE. The sixth transistor ST6 may be turned on by the emission control signal of the emission line EL to connect the second electrode of the driving transistor DT to the anode electrode of the light emitting element LE. The gate electrode of the sixth transistor ST6 may be connected to the emission line EL, the first electrode thereof may be connected to the second electrode of the driving transistor DT, and the second electrode thereof may be connected to the anode electrode of the light emitting element LE. In case that the fifth transistor ST5 and the sixth transistor ST6 are both turned on, the driving current Ids may be supplied to the light emitting element LE.

The first capacitor C1 may be formed between the second electrode of the driving transistor DT and the first driving voltage line VDDL. One electrode of the first capacitor C1 may be connected to the second electrode of the driving transistor DT, and the other electrode thereof may be connected to the first driving voltage line VDDL.

In case that the first electrode of each of the driving transistor DT and the first to sixth transistors ST1 to ST6 is a source electrode, the second electrode thereof may be a drain electrode. In other embodiments, in case that the first electrode of each of the driving transistor DT and the first to sixth transistors ST1 to ST6 is a drain electrode, the second electrode thereof may be a source electrode.

An active layer of each of the driving transistor DT and the first to sixth transistors ST1 to ST6 may be formed of at least one of polysilicon, amorphous silicon, and an oxide semiconductor. In case that a semiconductor layer of each of the driving transistor DT and the first to sixth transistors ST1 to ST6 may be formed of polysilicon, a process for forming the semiconductor layer may be a low temperature polysilicon (LTPS) process.

Further, in FIG. 7, the driving transistor DT and the first to sixth transistors ST1 to ST6 have been described as being formed as a p-type metal oxide semiconductor field effect transistor (MOSFET), but without being limited thereto, they may be formed as an n-type MOSFET. In case that the first to sixth transistors ST1, ST2, ST3, ST4, ST5, and ST6, and the driving transistor DT may be formed as N-type MOSFETs, the timing diagram of FIG. 9 may need to be modified in consideration of the characteristics of the N-type MOSFET.

The first driving voltage of the first driving voltage line VDDL, the second driving voltage of the second driving voltage line VSSL, and the initialization voltage of the initialization voltage line VIL may be set in consideration of the characteristics of the driving transistor DT and the characteristics of the light emitting element LE. For example, the voltage difference between the initialization voltage and the data voltage supplied to the source electrode of the driving transistor DT may be set to be smaller than the threshold voltage of the driving transistor DT.

Figure 8:
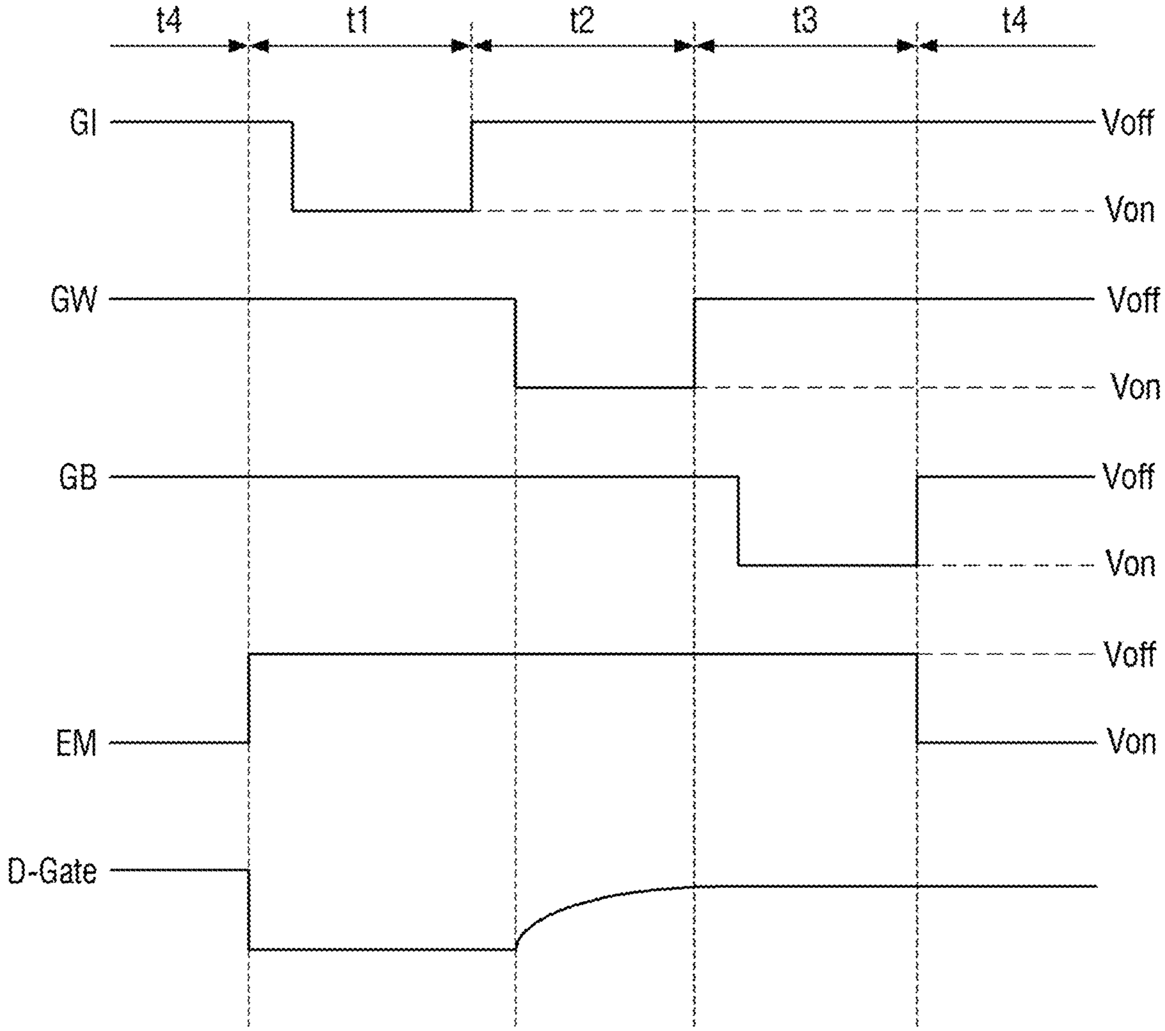
FIG. 8 is a schematic waveform diagram illustrating signals applied to the scan initialization line, the scan write line, the scan bias line, and the emission line of FIG. 7.

FIG. 8 is a schematic waveform diagram illustrating signals applied to the scan initialization line, the scan write line, the scan bias line, and the emission line of FIG. 7.

Referring to FIG. 8, the scan initialization signal G1, the scan write signal GW, and the scan bias signal GB may be sequentially outputted at a gate-on voltage Von during first to third periods t1, t2, and t3. For example, the scan initialization signal G1 may have the gate-on voltage Von during the first period t1 and may have a gate-off voltage Voff during the remaining period. The scan write signal GW may have the gate-on voltage Von during the second period t2 and may have the gate-off voltage Voff during the remaining period. The scan bias signal GB may have the gate-on voltage Von during the third period t3 and may have gate-off voltage Voff during the remaining period. FIG. 5 illustrates that the period, during which the scan initialization signal G1 has the gate-on voltage Von, is shorter than the first period t1, but the period, during which the scan initialization signal G1 has the gate-on voltage Von, may be substantially equal to the first period t1. FIG. 5 illustrates that the period, during which the scan write signal GW has the gate-on voltage Von, is shorter than the second period t2, but the period, during which the scan write signal GW has the gate-on voltage Von, may be substantially equal to the second period t2. FIG. 5 illustrates that the period, during which the scan bias signal GB has the gate-on voltage Von, may be shorter than the third period t3, but the period, during which the scan bias signal GB has the gate-on voltage Von, may be substantially equal to the third period t3.

The emission signal EM may have the gate-on voltage Von during the fourth period t4 and may have the gate-off voltage Voff during the remaining periods.

In FIG. 8, it is illustrated that each of the first period t1, the second period t2, and the third period t3 is one horizontal period. Since one horizontal period indicates the period in which the data voltage is supplied to each of the sub-pixels SP connected to a certain scan line of the display panel 10, it may be defined as one horizontal line scan period. The data voltages may be supplied to the data lines DL in synchronization with the gate-on voltage Von of each of the scan signals.

The gate-on voltage Von may correspond to a turn-on voltage capable of turning on each of the first to sixth transistors ST1, ST2, ST3, ST4, ST5, and ST6. The gate-off voltage Voff may correspond to a turn-off voltage capable of turning off each of the first to sixth transistors ST1, ST2, ST3, ST4, ST5, and ST6.

Hereinafter, the operation of the sub-pixel SP during the first period t1 to the fourth period t4 will be described with reference to FIGS. 7 and 8.

First, during the first period t1, the third transistor ST3 may be turned on so that the gate electrode of the driving transistor DT may be initialized to the initialization voltage of the initialization voltage line VIL.

Second, during the second period t2, the second transistor ST2 may be turned on, so that the gate electrode and the second electrode of the driving transistor DT may be connected to each other, and the driving transistor DT may be driven as a diode. The driving transistor DT forms a current path until a voltage difference Vsg between the gate electrode and the source electrode thereof reaches the threshold voltage Vth. Accordingly, the gate electrode and the second electrode of the driving transistor DT have a voltage that increases to the difference voltage Vdata-Vth between the data voltage Vdata and the threshold voltage Vth of the driving transistor DT during the second period t2. The difference voltage Vdata-Vth may be stored in the first capacitor C1.

Third, during the third period t3, the fourth transistor ST4 may be turned on, so that the anode electrode of the light emitting element LE may be initialized to the initialization voltage of the initialization voltage line VIL.

Fourth, the fifth transistor ST5 and the sixth transistor ST6 may be turned on during the fourth period t4, so that a driving current Ids, which flows according to the voltage of the gate electrode DT_G of the driving transistor DT, may be supplied to the light emitting element LE.

As will be described later, an overlapping area between the gate electrode DT_G of the driving transistor DT and the scan write line GWL may not exist. Accordingly, the parasitic capacitance Cb, which may occur between the gate electrode DT_G of the driving transistor DT and the scan write line GWL, may be prevented. The kickback voltage Vb, which may be due to the parasitic capacitance Cb and affects the gate electrode DT_G of the driving transistor DT, may also be prevented. As a result, it is possible to prevent the kickback voltage Vb due to the parasitic capacitance Cb from affecting the gate electrode DT_G of the driving transistor DT.

For example, the voltage of the gate electrode DT_G of the driving transistor DT may be prevented from varying for each sub-pixel SP due to the parasitic capacitance Cb. Therefore, it may be possible to prevent the user from recognizing the image non-uniformity due to the parasitic capacitance Cb, and the deterioration of the image quality may be prevented.

Figure 9:
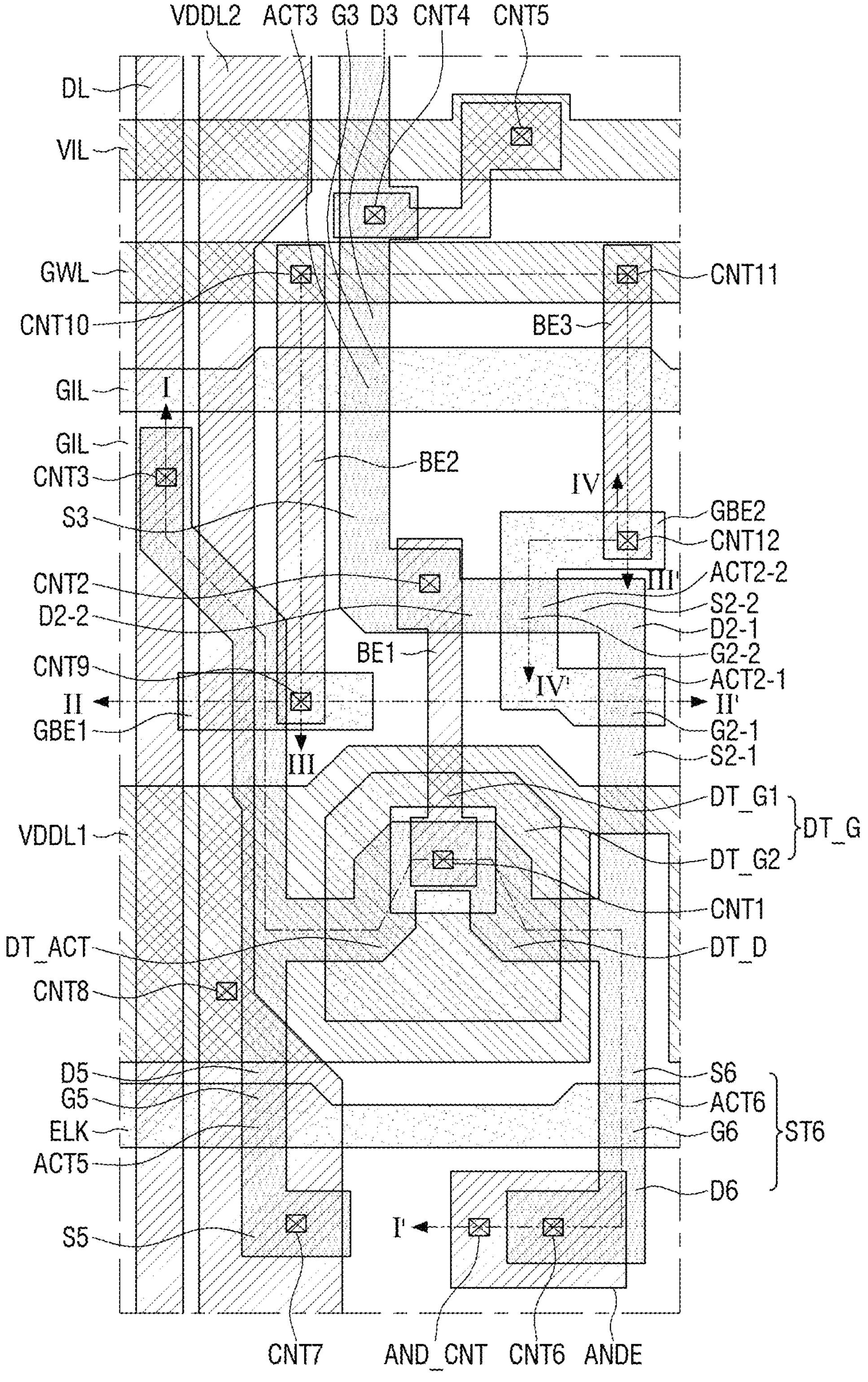
FIG. 9 is a schematic plan view illustrating a sub-pixel according to another embodiment.
Figure 10:
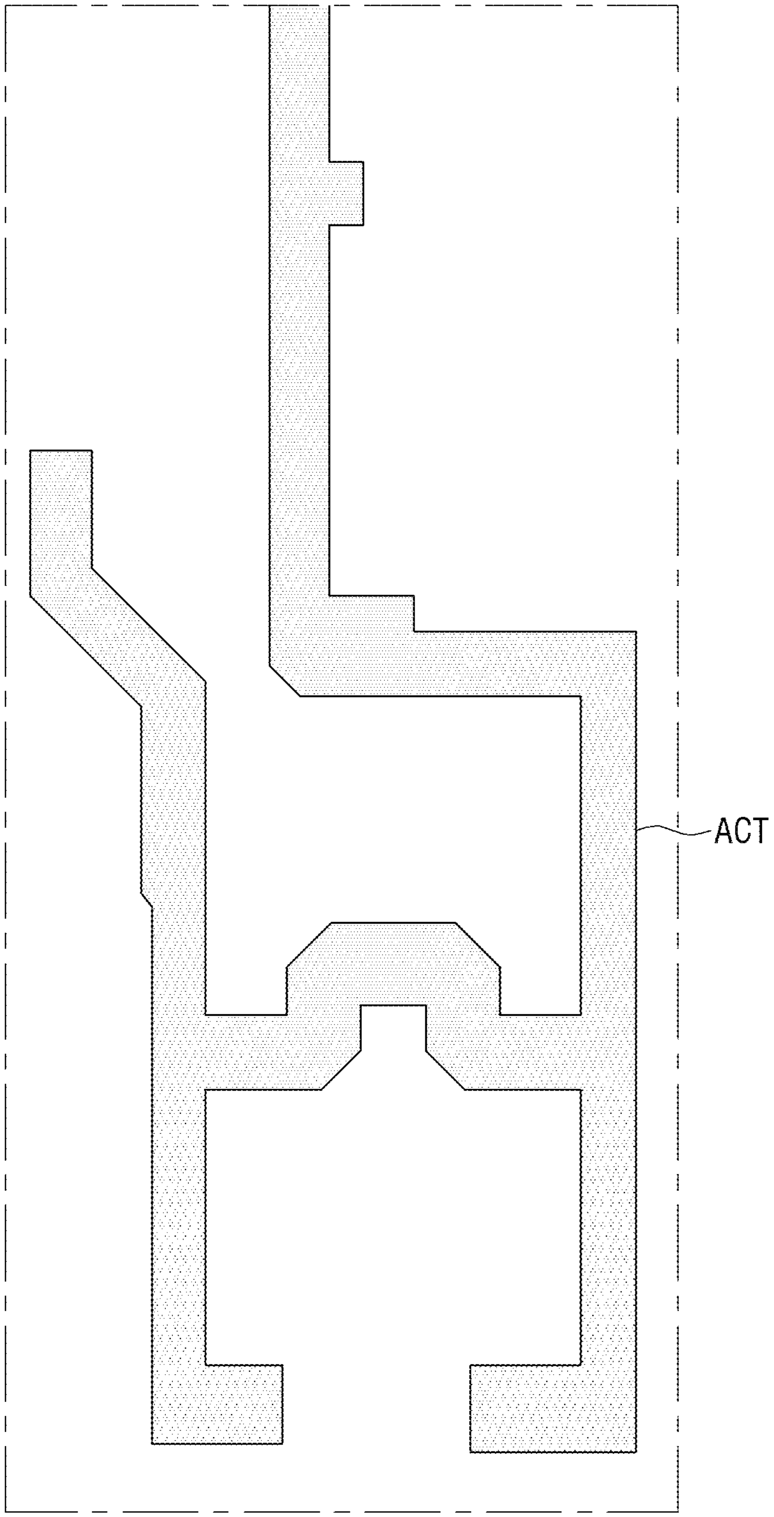
FIG. 10 is a schematic plan view illustrating an active layer of the sub-pixel of FIG. 9.
Figure 11:
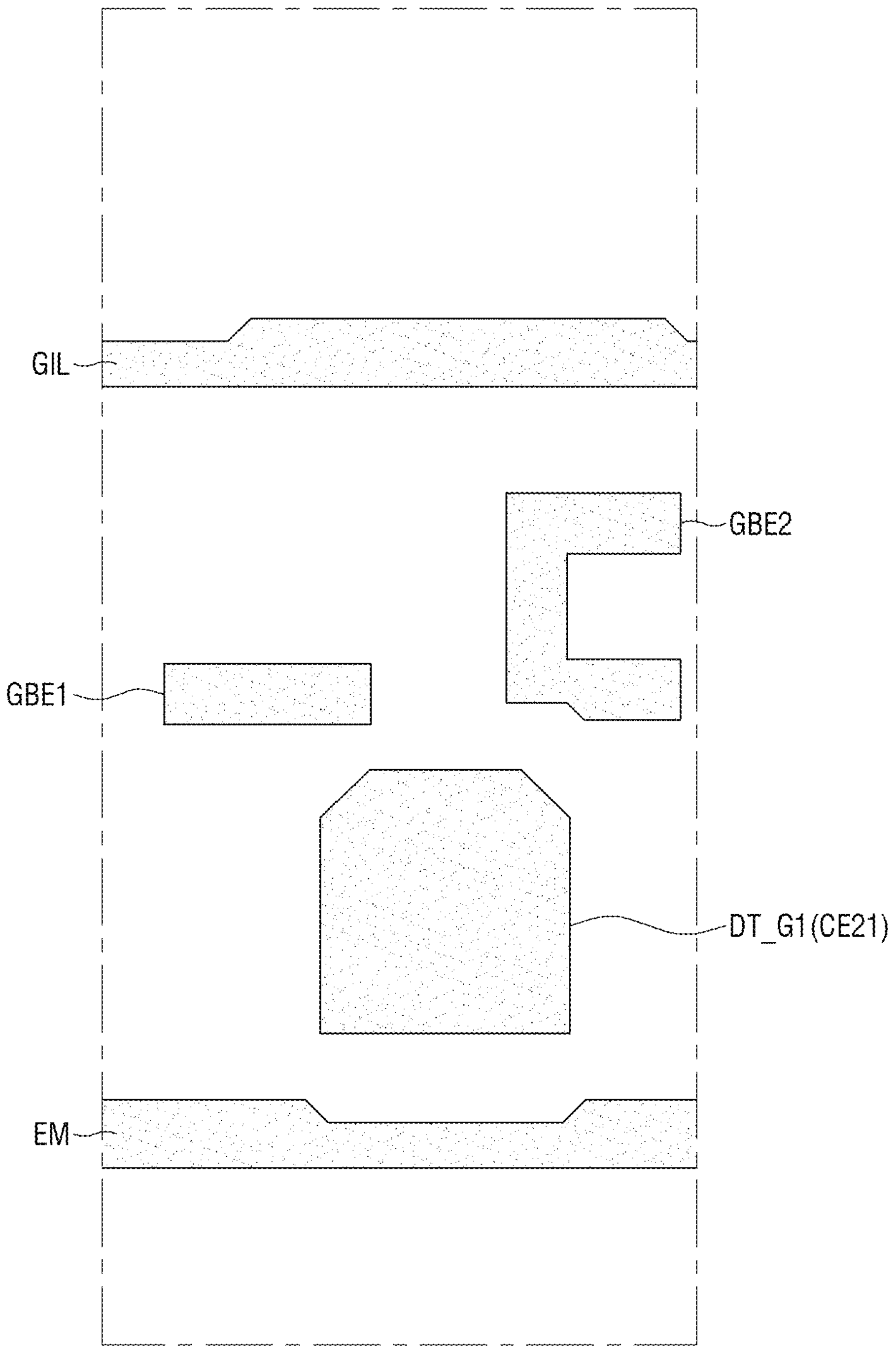
FIG. 11 is a schematic plan view illustrating a first gate layer of the sub-pixel of FIG. 9.
Figure 12:
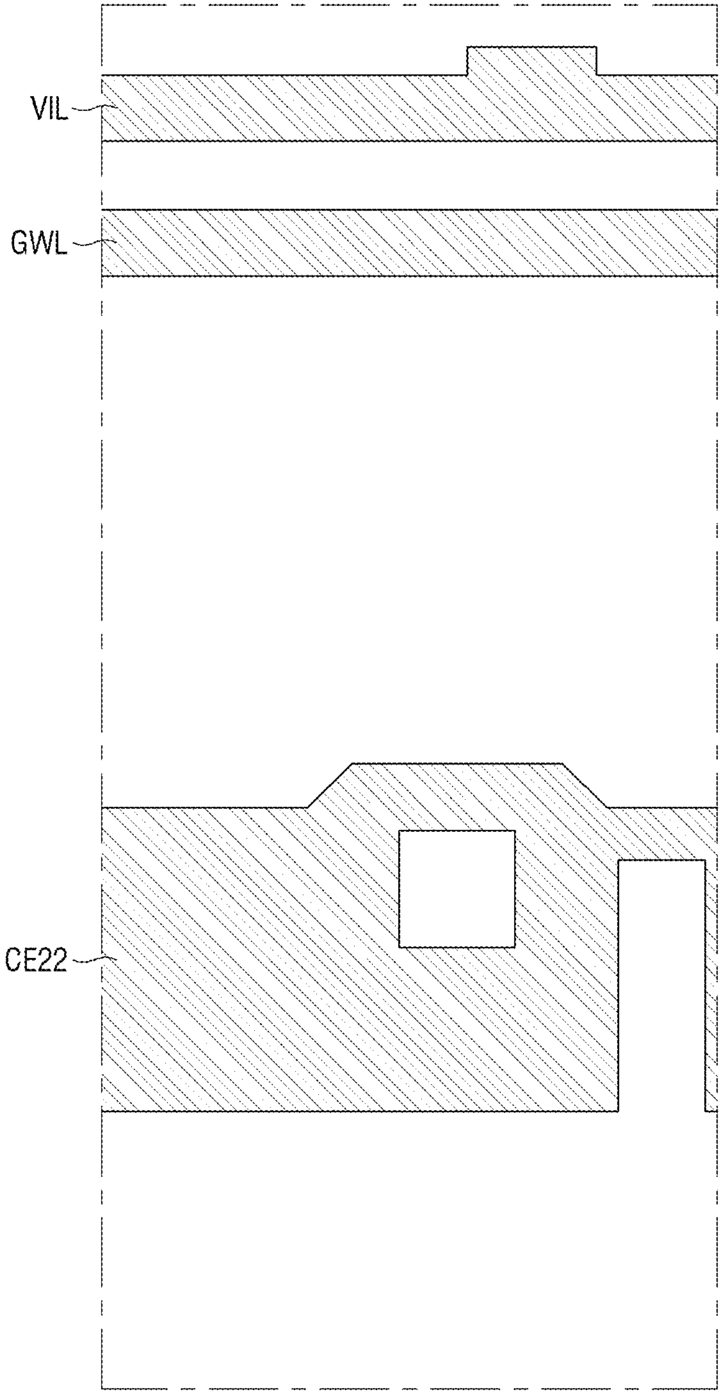
FIG. 12 is a schematic plan view illustrating a second gate layer of the sub-pixel of FIG. 9.
Figure 13:
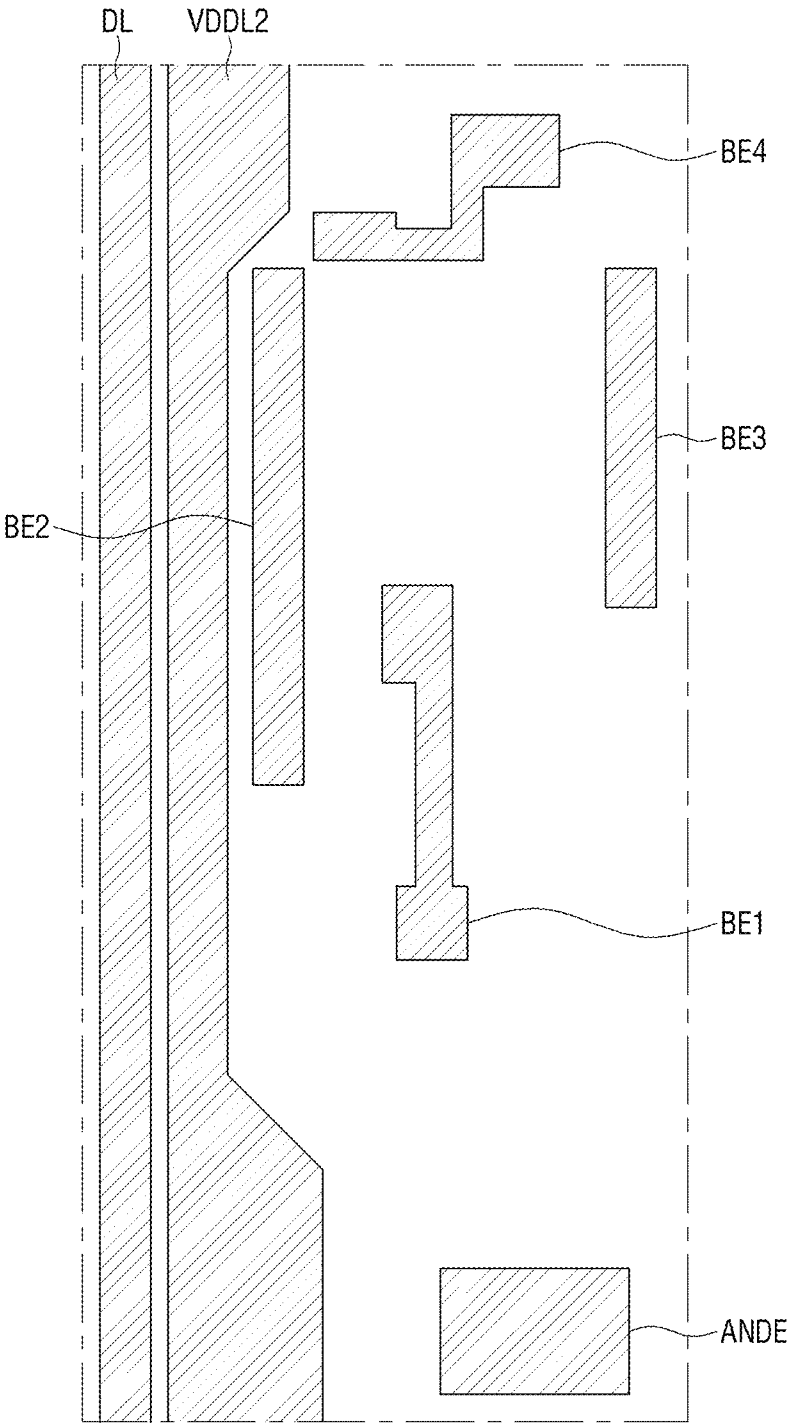
FIG. 13 is a schematic plan view illustrating a data metal layer of the sub-pixel of FIG. 12.

FIG. 9 is a schematic plan view illustrating a sub-pixel according to another embodiment. FIG. 10 is a schematic plan view illustrating an active layer of the sub-pixel of FIG. 9. FIG. 11 is a schematic plan view illustrating a first gate layer of the sub-pixel of FIG. 9. FIG. 12 is a schematic plan view illustrating a second gate layer of the sub-pixel of FIG. 9. FIG. 13 is a schematic plan view illustrating a data metal layer of the sub-pixel of FIG. 12.

Referring to FIGS. 9 to 13, each of the sub-pixels SP may include the driving transistor DT, the first to sixth transistors ST1 to ST6, and the first capacitor C1. The following description will be made in conjunction with an active layer ACT, a first gate layer GTL1, a second gate layer GTL2, and a data metal layer where they may be formed.

In FIGS. 9 and 10, the active layer ACT1 may include the driving transistor DT, and channel regions, first electrodes, and second electrodes of the first to sixth transistors ST1 to ST6.

In FIGS. 9 and 11, a first gate layer GTL1 disposed on the active layer ACT1 may include the gate electrode DT_G of the driving transistor DT, the scan initialization line GIL, a first gate connection electrode GBE1, a second gate connection electrode GBE2, and the emission line EL.

The scan initialization line GIL and the emission line EL may extend in a first direction (X-axis direction). Also, the first gate connection electrode GBE1 may extend in the first direction (X-axis direction). The scan initialization line GIL and the emission line EL may be sequentially disposed in a direction opposite to a second direction (Y-axis direction). The gate electrode DT_G of the driving transistor DT may be disposed between the scan initialization line GIL and the emission line EL, and may overlap the active layer ACT1 in a third direction (Z-axis direction).

The first gate connection electrode GBE1 may partially overlap each of a second connection electrode BE2 and a gate electrode G1 of the first transistor ST1 in the third direction (Z-axis direction). The second gate connection electrode GBE2 may partially overlap each of a third connection electrode BE3 and a gate electrode G2 of the second transistor ST2 in the third direction (Z-axis direction).

In FIGS. 9 and 12, the second gate layer GTL2 disposed above the first gate layer GTL1 may include a second capacitor electrode CE22, the scan write line GWL, and the initialization voltage line VIL.

The second capacitor electrode CE22 may overlap a first capacitor electrode CE21 and the gate electrode DT_G of the driving transistor DT in the third direction (Z-axis direction). The first capacitor electrode CE21 and the second capacitor electrode CE22 may be disposed between the scan write line GWL and the emission line EL.

The scan write line GWL and the initialization voltage line VIL may extend in the first direction (X-axis direction). The scan write line GWL and the initialization voltage line VIL may be sequentially disposed in the second direction (Y-axis direction). The second capacitor electrode CE22 may be disposed between the scan write line GWL and the initialization voltage line VIL.

The scan write line GWL may be disposed between the scan initialization line GIL and the initialization voltage line VIL. For example, the initialization voltage line VIL, the scan write line GWL, and the scan initialization line GIL may be sequentially disposed in a direction opposite to the second direction (Y-axis direction).

In FIGS. 9 and 13, a data metal layer DTL disposed above the second gate layer GTL2 may include the data line DL, a first-second driving voltage line VDDL2, the first connection electrode BE1, the second connection electrode BE2, the third connection electrode BE3, a fourth connection electrode BE4, and an anode connection electrode ANDE of the light emitting element LE. The data line DL and the first-second driving voltage line VDDL2 may extend in the second direction (Y-axis direction). The first connection electrode BE1, the second connection electrode BE2, and the third connection electrode BE3 may extend in the second direction (Y-axis direction).

The first-second driving voltage line VDDL2 may cross the scan initialization line GIL, the scan write line GWL, the first gate connection electrode GBE1, the second gate connection electrode GBE2, and the emission line EL, and may overlap the active layer ACT1 in the third direction (Z-axis direction). The first-second driving voltage line VDDL2 may not overlap the first gate connection electrode GBE1.

The first connection electrode BE1 may partially overlap each of the second capacitor electrode CE22, the gate electrode DT_G of the driving transistor DT, and the active layer ACT1 in the third direction (Z-axis direction). The first connection electrode BE1 may not overlap the scan write line GWL. Further, the first connection electrode BE1 may not overlap the first gate connection electrode GBE1.

The second connection electrode BE2 may partially overlap each of the first gate connection electrode GBE1, the scan initialization line GIL, and the scan write line GWL in the third direction (Z-axis direction). The second connection electrode BE2 may extend in the second direction (Y-axis direction) together with the first driving voltage line VDDL and the first connection electrode BEL.

The third connection electrode BE3 may partially overlap each of the second gate connection electrode GBE2, the scan initialization line GIL, and the scan write line GWL in the third direction (Z-axis direction). The third connection electrode BE3 may extend in the second direction (Y-axis direction).

The anode connection electrode ANDE may overlap each of the emission line EL and the active layer ACT1 in the third direction (Z-axis direction).

Referring to FIGS. 9 to 13, the driving transistor DT may include an active layer DT_ACT, the gate electrode DT_G, a first electrode DT_S, and a second electrode DT_D. The active layer DT_ACT of the driving transistor DT may overlap the gate electrode DT_G of the driving transistor DT. The gate electrode DT_G of the driving transistor DT may include a first gate electrode DT_G1 and a second gate electrode DT_G2. The second gate electrode DT_G2 may be disposed above the first gate electrode DT_G1, and the first gate electrode DT_G1 may be connected to the second gate electrode DT_G2 through a first contact hole CNT1. The first gate electrode DT_G1 may overlap the active layer DT_ACT of the driving transistor DT, and the second driving gate electrode DT_G2 may be connected to a second electrode D2-1 of the second-first transistor ST2-1 through a second contact hole CNT2. The first electrode DT_S of the driving transistor DT may be connected to a first electrode S1 of the first transistor ST1. The second electrode DT_D of the driving transistor DT may be connected to a first electrode S2-2 of the second-second transistor ST2-2 and a first electrode S6 of the sixth transistor ST6.

The first transistor ST1 may include the active layer ACT1, the gate electrode G1, the first electrode S1, and a second electrode D1. The gate electrode G1 of the first transistor ST1 may be a part of the first gate connection electrode GBE1, and may be an overlapping area between the active layer ACT1 of the first transistor ST1 and the first gate connection electrode GBE1. The first electrode S1 of the first transistor ST1 may be connected to the first electrode DT_S of the driving transistor DT. The second electrode D1 of the first transistor ST1 may be connected to the data line DL through a third contact hole CNT3.

The first gate connection electrode GBE1 may be connected to the scan write line GWL via the second connection electrode BE2. Specifically, the first gate connection electrode GBE1 may be connected to the second connection electrode BE2 through a ninth contact hole CNT9. Further, the second connection electrode BE2 may be connected to the scan write line GWL through a tenth contact hole CNT10. The first gate connection electrode GBE1 may overlap the second connection electrode BE2. The second connection electrode BE2 may overlap the scan write line GWL. Accordingly, the gate electrode G1 of the first transistor ST1, which may be a part of the first gate connection electrode GBE1, may be connected to the scan write line GWL.

The second transistor ST2 may be formed as a dual transistor. The second transistor ST2 may include the second-first transistor ST2-1 and the second-second transistor ST2-2.

The second-first transistor ST2-1 may include an active layer ACT2-1, agate electrode G2-1, a first electrode S2-1, and a second electrode D2-1. The gate electrode G2-1 of the second-first transistor ST2-1 may be a part of the second gate connection electrode GBE2, and may be an overlapping area between the active layer ACT2-1 of the second-first transistor ST2-1 and the second gate connection electrode GBE2. The first electrode S2-1 of the second-first transistor ST2-1 may be connected to a second electrode D2-2 of the second-second transistor ST2-2. The second electrode D2-1 of the second-first transistor ST2-1 may be connected to the second gate electrode DT_G2 of the driving transistor DT through the second contact hole CNT2.

The second-second transistor ST2-2 may include an active layer ACT2-2, a gate electrode G2-2, the first electrode S2-2, and the second electrode D2-2. The gate electrode G2-2 of the second-second transistor ST2-2 may be a part of the second gate connection electrode GBE2, and may be an overlapping area between the second active layer ACT2-2 of the second-second transistor ST2-2 and the second gate connection electrode GBE2. The first electrode S2-2 of the second-second transistor ST2-2 may be connected to the second electrode DT_D of the driving transistor DT. The second electrode D2-2 of the second-second transistor ST2-2 may be connected to the first electrode S2-1 of the second-first transistor ST2-1.

The second gate connection electrode GBE2 may be connected to the scan write line GWL via the third connection electrode BE3. Specifically, the second gate connection electrode GBE2 may be connected to the third connection electrode BE3 through a twelfth contact hole CNT12. Further, the third connection electrode BE3 may be connected to the scan write line GWL through an eleventh contact hole CNT11. The second gate connection electrode GBE2 may overlap the third connection electrode BE3. The third connection electrode BE3 may overlap the scan write line GWL. Accordingly, the gate electrode G2-1 of the second-first transistor ST2-1 may be connected to the scan write line GWL. Further, the gate electrode G2-2 of the second-second transistor ST2-2 may be connected to the scan write line GWL.

The third transistor ST3 may include an active layer ACT3, a gate electrode G3, a first electrode S3, and a second electrode D3. The gate electrode G3 of the third transistor ST3 may be a part of the scan initialization line GIL, and may be an overlapping area between the active layer ACT3 of the third transistor ST3 and the scan initialization line GIL. The first electrode S3 of the third transistor ST3 may be connected to the second gate electrode DT_G2 of the driving transistor DT through the second contact hole CNT2. The second electrode D3 of the third transistor ST3 may be connected to the initialization voltage line VIL through a fourth contact hole CNT4.

The fifth transistor ST5 may include an active layer ACT5, a gate electrode G5, a first electrode S5, and a second electrode D5. The gate electrode G5 of the fifth transistor ST5 may be a part of a $k^{th}$ emission line Elk, and may be a region where the active layer ACT5 of the fifth transistor ST5 overlaps the $k^{th}$ emission line Elk. The first electrode S5 of the fifth transistor ST5 may be connected to a first-second driving voltage line VDDL2 through a seventh contact hole CNT7. The second electrode D5 of the fifth transistor ST5 may be connected to the first electrode DT_S of the driving transistor DT.

The sixth transistor ST6 may include an active layer ACT6, a gate electrode G6, a first electrode S6, and a second electrode D6. The gate electrode G6 of the sixth transistor ST6 may be a part of the k1 emission line Elk, and may be a region where the active layer ACT6 of the sixth transistor ST6 overlaps the k1 emission line Elk. The first electrode S6 of the sixth transistor ST6 may be connected to the second electrode DT_D of the driving transistor DT. The second electrode D6 of the sixth transistor ST6 may be connected to an anode electrode of the light emitting element through the sixth contact hole CNT6.

A first electrode CE21 of the first capacitor C1 may be a part of the second electrode DT_D of the driving transistor DT. The second electrode CE22 of the first capacitor C1 may be a first-first driving voltage line VDDL1 that overlaps the second electrode DT_D of the driving transistor DT. The first-first driving voltage line VDDL1 may be connected to the first-second driving voltage line VDDL2 through an eighth contact hole CNT8. The first-second driving voltage line VDDL2 may be arranged to be parallel with the data line DL in the second direction, and the first-first driving voltage line VDDL1 may be arranged to be parallel with the scan write line GWL in the first direction.

According to an embodiment shown in FIGS. 9 to 13, the scan write line GWL may be connected to each of the second connection electrode BE2 and the third connection electrode BE3. The second connection electrode BE2 may be connected to the gate electrode G1 of the first transistor ST1 that may be a part of the first gate connection electrode GBE1. Further, the third connection electrode BE3 may be connected to the gate electrode G3 of the third transistor ST3 that may be a part of the second gate connection electrode GBE2. Accordingly, an overlapping area may not exist between the gate electrode DT_G of the driving transistor DT and the scan write line GWL.

Thus, according to an embodiment, the parasitic capacitance Cb, which may occur between the gate electrode DT_G of the driving transistor DT and the scan write line GWL, may be prevented. The kickback voltage Vb due to the parasitic capacitance Cb may also be prevented in the gate electrode DT_G of the driving transistor DT.

That is, by preventing the parasitic capacitance Cb, it is possible to prevent the kickback voltage Vb from affecting the gate electrode DT_G of the driving transistor DT. Accordingly, since the luminance of the light emitting element LE may be uniformly maintained among the sub-pixels SP, deterioration of image quality may be prevented.

Figure 14:
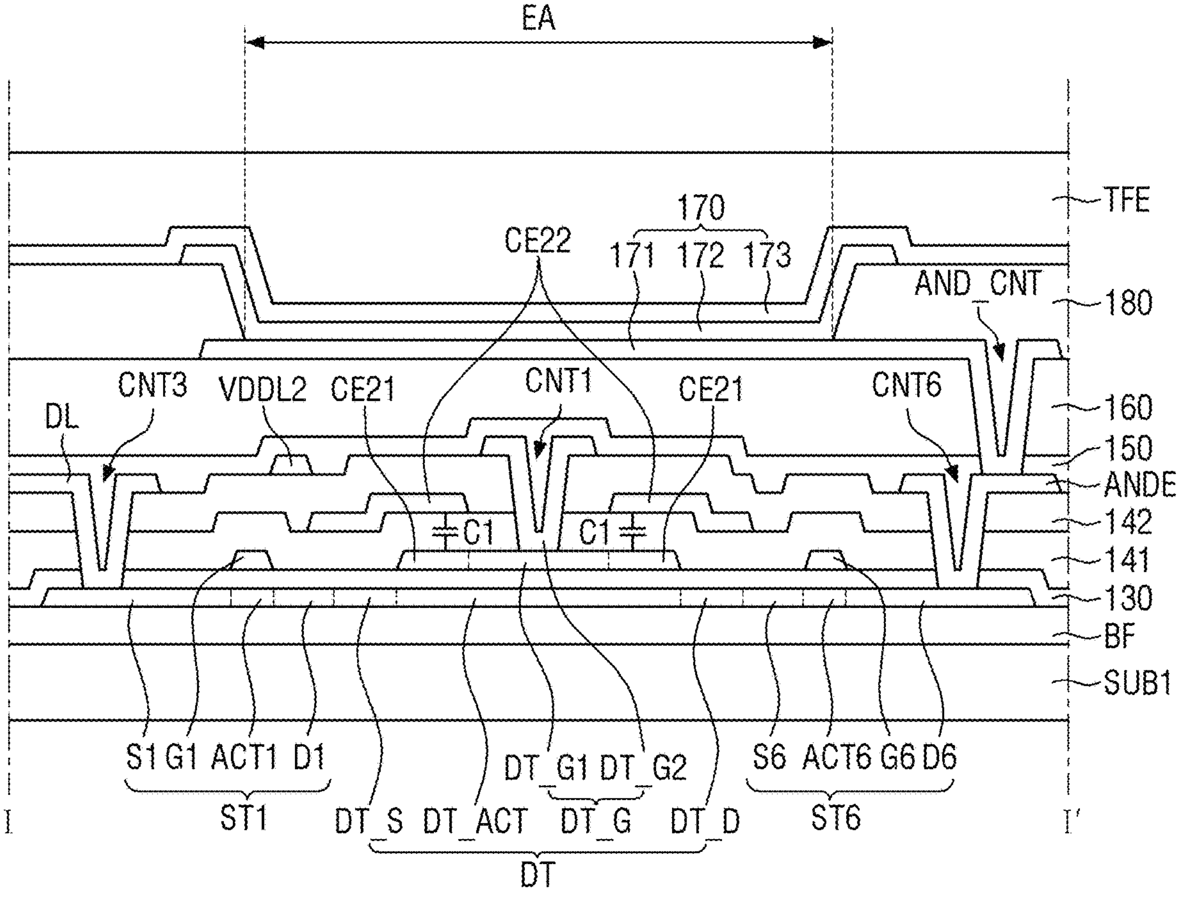
FIG. 14 is a schematic cross-sectional view illustrating an example taken along line I-I' of FIG. 9.
Figure 15:
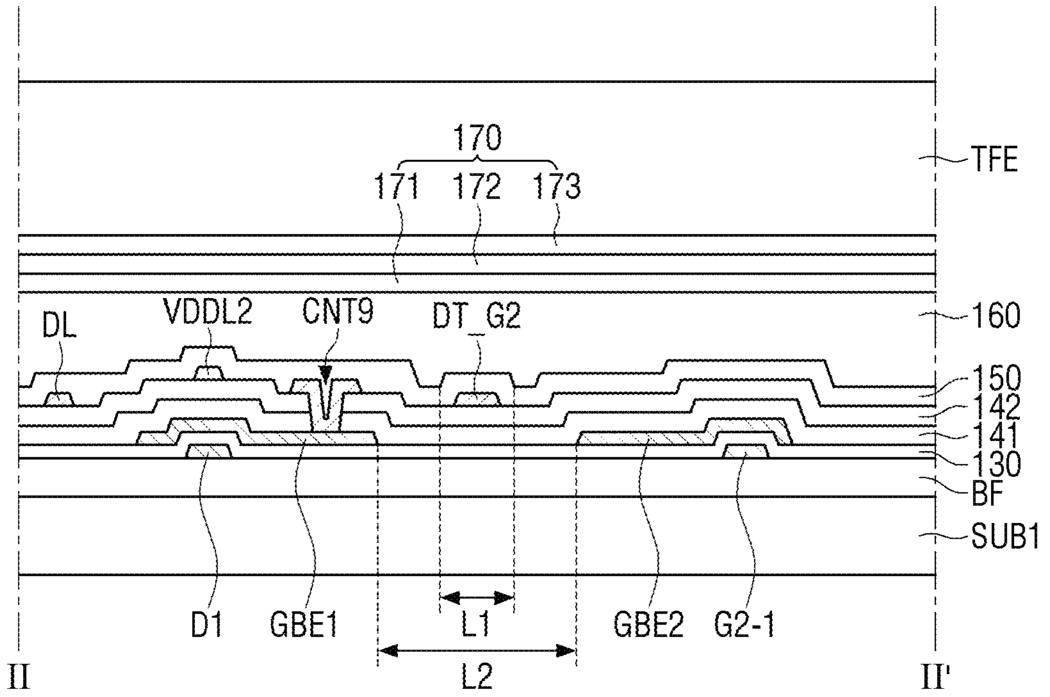
FIG. 15 is a schematic cross-sectional view illustrating an example taken along line II-II' of FIG. 9.
Figure 16:
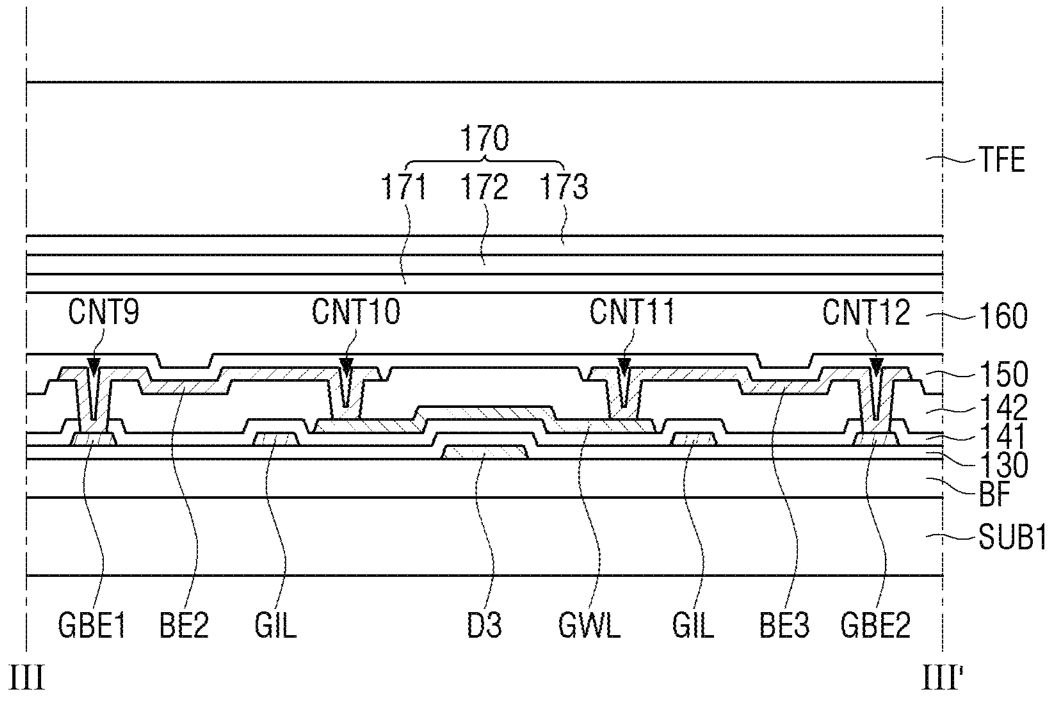
FIG. 16 is a schematic cross-sectional view illustrating an example taken along line III-III' of FIG. 9.
Figure 17:
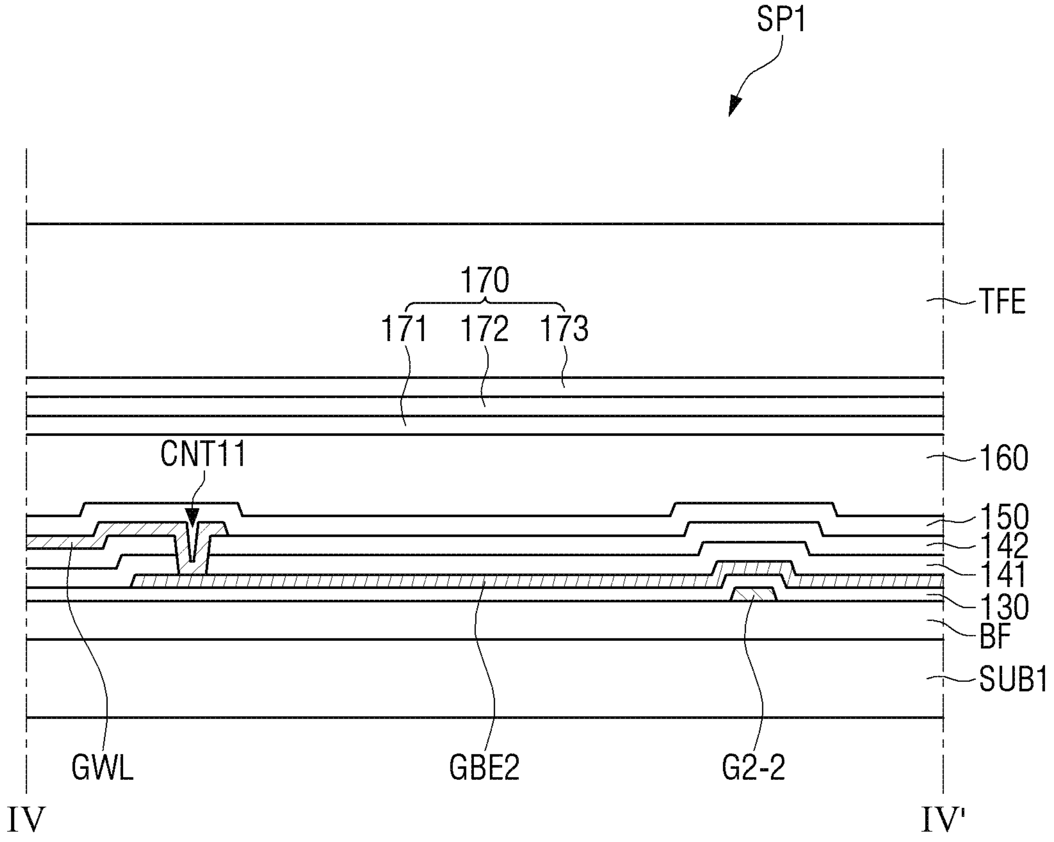
FIG. 17 is a schematic cross-sectional view illustrating an example taken along line IV-IV' of FIG. 9.

FIG. 14 is a schematic cross-sectional view illustrating an example taken along line I-I' of FIG. 9. FIG. 15 is a schematic cross-sectional view illustrating an example taken along line II-II' of FIG. 9. FIG. 16 is a schematic cross-sectional view illustrating an example taken along line III-III' of FIG. 9. FIG. 17 is a schematic cross-sectional view illustrating an example taken along line IV-IV' of FIG. 9.

Referring to FIGS. 14 to 17, a thin film transistor layer TFTL, a light emitting element layer, and an encapsulation layer TFE may be sequentially formed on a first substrate SUB1.

The thin film transistor layer TFTL may include a buffer layer BF, the active layer ACT1, the first gate layer GTL1, the second gate layer GTL2, the data metal layer DTL, a gate insulating layer 130, a first interlayer insulating layer 141, a second interlayer insulating layer 142, a passivation layer 150, and a planarization layer 160.

The buffer layer BF may be formed on a surface of the first substrate SUB1. The buffer layer BF may be formed on the first substrate SUB1 to protect thin film transistors and the organic light emitting layer 172 of the light emitting element layer from moisture permeating through the first substrate SUB1 susceptible to moisture permeation. The buffer layer BF may be formed of inorganic layers that may be alternately stacked on each other. For example, the buffer layer BF may be formed of multiple layers in which one or more inorganic layers of a silicon nitride layer, a silicon oxynitride layer, a silicon oxide layer, a titanium oxide layer and an aluminum oxide layer may be alternately stacked on each other. The buffer layer BF may be omitted.

The active layer ACT1 may be formed on the first substrate SUB1 or the buffer layer BF. The active layer ACT1 may include polycrystalline silicon, monocrystalline silicon, low-temperature polycrystalline silicon, amorphous silicon, an oxide semiconductor, or a combination thereof.

In case that the active layer ACT1 is made of polycrystalline silicon and ions are doped into the active layer ACT1, the ion-doped active layer ACT1 may have conductivity. Due to this, the active layer ACT1 may include not only the active layers DT_ACT, ACT1 to ACT6 of the driving transistor DT and the first to sixth switching transistors ST1 to ST6, but also the source electrodes DT_S, S1, S2-1, S2-2, S3, S4, S5, and S6 and the drain electrodes DT_D, D1, D2-1, D2-2, D3, D4, D5, and D6 of the driving transistor DT and the first to sixth switching transistors ST1 to ST6.

The gate insulating layer 130 may be formed on the active layer ACT1. The gate insulating layer 130 may be formed of an inorganic layer, for example, a silicon nitride layer, a silicon oxynitride layer, a silicon oxide layer, a titanium oxide layer, and/or an aluminum oxide layer.

The first gate layer GTL1 may be formed on the gate insulating layer 130. The first gate layer GTL1 may include not only the driving transistor DT and the gate electrodes DT_G1 and G1 to G6 of the first to sixth switching transistors ST1 to ST6 but also the scan initialization lines GIL and the emission lines EL. Further, the first gate layer GTL1 may include the first gate connection electrode GBE1 and the second gate connection electrode GBE2.

The first gate layer GTL1 may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

The first interlayer insulating layer 141 may be formed on the first gate layer GTL1. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may include inorganic layers.

The second gate layer GTL2 may be formed on the first interlayer insulating layer 141. The second gate layer GTL2 may include the initialization voltage line VIL and the first-first driving voltage line VDDL1. Further, the second gate layer GTL2 may include the scan write line GWL.

The second gate layer GTL2 may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

The second interlayer insulating layer 142 may be formed on the second gate layer GTL2. The second interlayer insulating layer 142 may be formed of an inorganic layer, for example, a silicon nitride layer, a silicon oxynitride layer, a silicon oxide layer, a titanium oxide layer, and/or an aluminum oxide layer. The second interlayer insulating layer 142 may include inorganic layers.

The data metal layer DTL may be formed on the second interlayer insulating layer 142. The data metal layer DTL may include the data lines DL, the first driving voltage lines VDDL1, the second gate electrode DT_G2 of the driving transistor DT, the anode connection electrode ANDE, and the initialization voltage line VIL.

The data metal layer DTL may include the first connection electrode BE1, the second connection electrode BE2, and the third connection electrode BE3. The second connection electrode BE2 may include the same material as the first connection electrode BEL. Also, the third connection electrode BE3 may include the same material as the first connection electrode BE1. For example, the first connection electrode BE1, the second connection electrode BE2, and the third connection electrode BE3 may include the same material.

The data metal layer DTL may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

The planarization layer 160 may be formed above the data metal layer DTL to flatten steps caused by the active layer ACT1, the first gate layer GTL1, the second gate layer GTL2, and the data metal layer DTL. The planarization layer 160 may be formed of an organic layer such as acryl resin, epoxy resin, phenolic resin, polyamide resin, polyimide resin and/or the like.

The passivation layer 150 may be further formed between the data metal layer DTL and the planarization layer 160. The passivation layer 150 may be formed of an inorganic layer, for example, a silicon nitride layer, a silicon oxynitride layer, a silicon oxide layer, a titanium oxide layer, and/or an aluminum oxide layer.

As shown in FIG. 9, the driving transistor DT and the first to sixth transistors ST1 to ST6 are disclosed as being formed in a top gate structure in which the gate electrode is located above the active layer, but the disclosure is not limited thereto. For example, the driving transistor DT and the first to sixth transistors ST1 to ST6 may be formed in a bottom gate structure in which the gate electrode is located under the active layer or in a double gate structure in which the gate electrodes are located above and under the active layer.

As shown in FIG. 14, the first contact hole CNT1 may penetrate the first interlayer insulating layer 141 and the second interlayer insulating layer 142 to expose the first gate electrode DT_G1 of the driving transistor DT. The second gate electrode DT_G2 of the driving transistor DT may be connected to the first gate electrode DT_G1 of the driving transistor DT through the first contact hole CNT1.

The second hole CNT2 may penetrate the gate insulating layer 130, the first interlayer insulating layer 141, and the second interlayer insulating layer 142 to expose the second electrode D2-1 of the second-first transistor ST2-1. The second gate electrode DT_G2 of the driving transistor DT may be connected to the second electrode D2-1 of the second-first transistor ST2-1 through the second contact hole CNT2.

The third contact hole CNT3 may penetrate the gate insulating layer 130, the first interlayer insulating film 141, and the second interlayer insulating film 142 to expose the first electrode S1 of the first transistor ST1. The data line DL may be connected to the first electrode S1 of the first transistor ST1 through the third contact hole CNT3.

The fourth contact hole CNT4 may penetrate the gate insulating layer 130, the first interlayer insulating layer 141, and the second interlayer insulating layer 142 to expose the second electrode D3 of the third transistor ST3 and the second electrode D3 of the fourth transistor ST4. The initialization voltage line VIL may be connected to the second electrode D3 of the third transistor ST3 and the second electrode D4 of the fourth transistor ST4 through the fourth contact hole CNT4.

The fifth contact hole CNT5 may penetrate the second interlayer insulating film 142 to expose the initialization voltage line VIL. The initialization voltage line VIL may be connected to the initialization voltage line VIL through the fifth contact hole CNT5.

The sixth contact hole CNT6 may penetrate the gate insulating layer 130, the first interlayer insulating layer 141, and the second interlayer insulating layer 142 to expose the second electrode D6 of the sixth transistor ST6. The anode connection electrode ANDE may be connected to the second electrode D6 of the sixth transistor ST6 through the sixth contact hole CNT6.

The seventh contact hole CNT7 may penetrate the gate insulating layer 130, the first interlayer insulating layer 141, and the second interlayer insulating layer 142 to expose the first electrode S5 of the fifth transistor ST5. The first-second driving voltage line VDDL2 may be connected to the first electrode S5 of the fifth transistor ST5 through the seventh contact hole CNT7.

The eighth contact hole CNT8 may be a hole that penetrates the second interlayer insulating layer 142 to expose the first-first driving voltage line VDDL1. The first-second driving voltage line VDDL2 may be connected to the first-first driving voltage line VDDL1 through the eighth contact hole CNT8.

The ninth contact hole CNT9 may be a hole that penetrates the first interlayer insulating layer 141 and the second interlayer insulating layer 142 to expose the first gate connection electrode GBE1. The second connection electrode BE2 may be connected to the gate electrode G1 of the first transistor ST1, which may be a part of the first gate connection electrode GBE1, through the ninth contact hole CNT9.

The tenth contact hole CNT10 may be a hole that penetrates the second interlayer insulating layer 142 to expose the scan write line GWL. The scan write line GWL may be connected to the second connection electrode BE2 through the tenth contact hole CNT10.

The eleventh contact hole CNT11 may be a hole that penetrates the second interlayer insulating layer 142 to expose the scan write line GWL. The scan write line GWL may be connected to the third connection electrode BE3 through the eleventh contact hole CNT11.

The twelfth contact hole CNT12 may be a hole that penetrates the first interlayer insulating layer 141 and the second interlayer insulating layer 142 to expose the second gate connection electrode GBE2. The third connection electrode BE3 may be connected to the gate electrode G2 of the second transistor ST2, which may be a part of the second gate connection electrode GBE2, through the twelfth contact hole CNT12.

The anode contact hole AND_CNT may be the hole exposing the anode connection electrode ANDE while penetrating the passivation layer 150 and the planarization layer 160.

The light emitting element layer may be formed on the thin film transistor layer TFTL. The light emitting element layer may include light emitting elements 170 and a pixel defining layer 180.

The light emitting elements 170 and the pixel defining layer 180 may be formed on the planarization layer 160. Each of the light emitting elements 170 may include a first electrode 171, an organic light emitting layer 172, and a second electrode 173.

The first electrode 171 may be formed on the planarization layer 160. The first electrode 171 may be connected to the anode connection electrode ANDE through the anode contact hole AND_CNT penetrating the passivation layer 150 and the planarization layer 160.

In a top emission structure in which light is emitted toward the second electrode 173 when viewed with respect to the organic light emitting layer 172, the first electrode 171 may be formed of a metal material having high reflectivity such as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO. The APC alloy may be an alloy of silver (Ag), palladium (Pd) and copper (Cu).

The pixel defining layer 180 may be formed to partition the first electrode 171 on the planarization layer 250 to define an emission area EA of each of the sub-pixels SP. The pixel defining layer 180 may be formed to cover the edge of the first electrode 171. The pixel defining layer 180 may be formed of an organic layer such as acryl resin, epoxy resin, phenolic resin, polyamide resin, polyimide resin and/or the like.

The emission area EA of each of the sub-pixels SP represents a region in which the first electrode 171, the organic light emitting layer 172, and the second electrode 173 may be sequentially stacked on each other and holes from the first electrode 171 and electrons from the second electrode 173 may be coupled to each other in the organic light emitting layer 172 to emit light.

The organic light emitting layer 172 may be disposed on the first electrode 171 and the pixel defining layer 180. The organic light emitting layer 172 may include an organic material to emit light in a predetermined or selectable color. For example, the organic light emitting layer 172 may include a hole transporting layer, an organic material layer, and an electron transporting layer.

The organic light emitting layer 172 of the sub-pixel SP may emit light of first to third colors. In other embodiments, the organic light emitting layer 172 of the sub-pixel SP may emit white light. The sub-pixel SP may overlap color filter layers of the first to third colors. The first color may be red, the second color may be green, and the third color may be blue, but the disclosure is not limited thereto.

The second electrode 173 may be formed on the organic light emitting layer 172. The second electrode 173 may be formed to cover the organic light emitting layer 172. The second electrode 173 may be a common layer commonly formed on the sub-pixels SP1, SP2, and SP3. A capping layer may be formed on the second electrode 173.

In the top emission structure, the second electrode 173 may be formed of a transparent conductive material (TCO) such as ITO or IZO capable of transmitting light or a semi-transmissive conductive material such as magnesium (Mg), silver (Ag), or an alloy of magnesium (Mg) and silver (Ag). In case that the second electrode 173 is formed of a semi-transmissive metal material, the light emission efficiency can be increased due to a micro-cavity effect.

The encapsulation layer TFE may be formed on the light emitting element layer. The encapsulation layer TFE may include at least one inorganic layer to prevent oxygen or moisture from permeating into the light emitting element layer. The encapsulation layer TFE may include at least one organic layer to protect the light emitting element layer from foreign substances such as dust.

In other embodiments, instead of the encapsulation layer TFE, a second substrate may be disposed on the light emitting element layer, and the space between the light emitting element layer and the second substrate may be empty in a vacuum state or a filling film may be disposed therein. The filling film may be an epoxy filling film or a silicon filling film.

Figure 18:
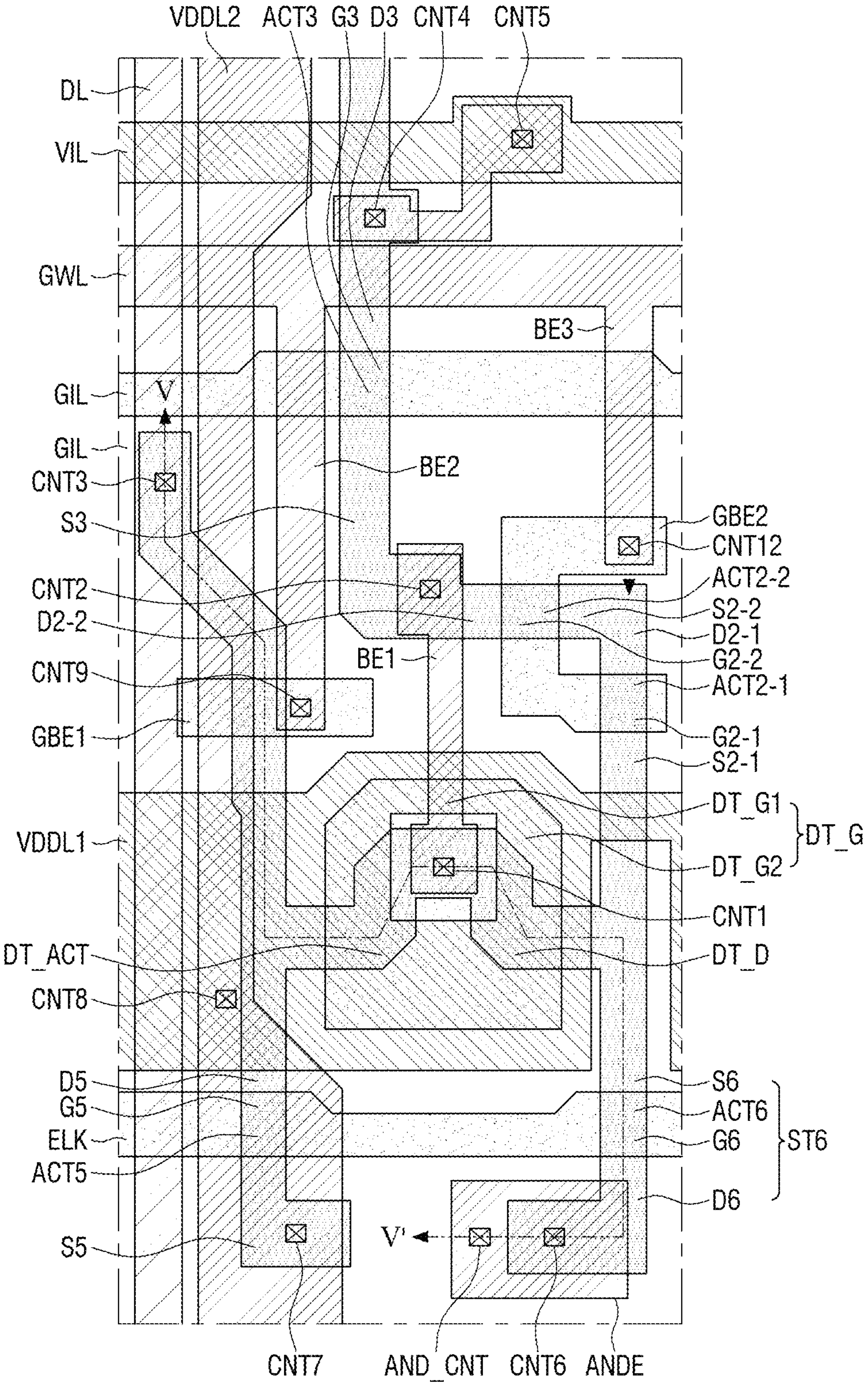
FIG. 18 is a schematic plan view illustrating a sub-pixel according to still another embodiment.
Figure 19:
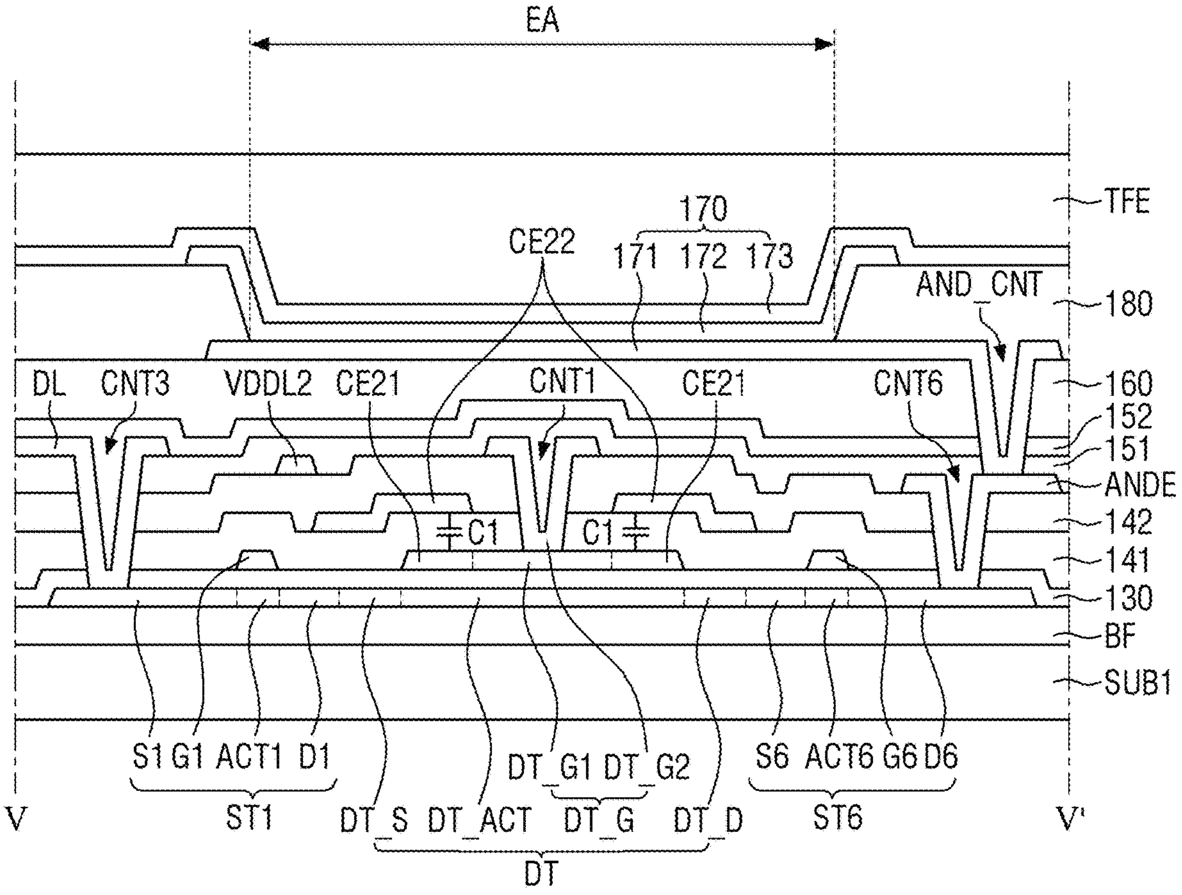
FIG. 19 is a schematic cross-sectional view illustrating an example taken along line V-V' of FIG. 18.

FIG. 18 is a schematic plan view illustrating a sub-pixel according to still another embodiment. FIG. 19 is a schematic cross-sectional view illustrating an example taken along line V-V' of FIG. 18.

An embodiment of FIGS. 18 and 19 may be substantially the same as an embodiment of FIGS. 9 to 17 except for the data line DL and the scan write line GWL, and thus the following description will be focused on differences of the data line DL and the scan write line GWL from an embodiment of FIGS. 9 to 17.

Referring to FIG. 18, a first data metal layer DTL1 disposed on the second gate layer GTL2 may further include the scan write line GWL.

The scan write line GWL and the initialization voltage line VIL may extend in the first direction (X-axis direction). The scan write line GWL and the initialization voltage line VIL may be sequentially disposed in the second direction (Y-axis direction). The second capacitor electrode CE22 may be disposed between the scan write line GWL and the initialization voltage line VIL.

The scan write line GWL may be disposed between the scan initialization line GIL and the initialization voltage line VIL. For example, the initialization voltage line VIL, the scan write line GWL, and the scan initialization line GIL may be disposed sequentially in a direction opposite to the second direction (Y-axis direction).

The scan write line GWL may be connected to the second connection electrode BE2 and the third connection electrode BE3 on the same plane. Further, the scan write line GWL may be made of the same material as the second connection electrode BE2 and the third connection electrode BE3.

A second data metal layer DTL2 disposed on the first data metal layer DTL1 may include the data line DL. The data line DL may be substantially the same as that of an embodiment of FIGS. 9 to 17 except that it may be included in the second data metal layer DTL2, and thus a description thereof will be omitted.

Referring to FIGS. 18 and 19, the first data metal layer DTL1 may be formed on the second interlayer insulating layer 142. The first data metal layer DTL1 may further include the scan write line GWL.

The first data metal layer DTL1 may include the first connection electrode BE1, the second connection electrode BE2, and the third connection electrode BE3. The scan write line GWL may include the same material as the first connection electrode BEL. The second connection electrode BE2 may include the same material as the first connection electrode BE1. Also, the third connection electrode BE3 may include the same material as the first connection electrode BE1. For example, the scan write line GWL, the first connection electrode BE1, the second connection electrode BE2, and the third connection electrode BE3 may include the same material.

The second data metal layer DTL2 may be formed on the first data metal layer DTL1. The second data metal layer DTL2 may include the data line DL.

The second data metal layer DTL2 may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

The planarization layer 160 may be formed above the second data metal layer DTL2 to flatten steps caused by the active layer ACT1, the first gate layer GTL1, the second gate layer GTL2, and the second data metal layer DTL2. The planarization layer 160 may be formed of an organic layer such as acryl resin, epoxy resin, phenolic resin, polyamide resin, polyimide resin and/or the like.

A first passivation layer 151 may be additionally formed between the first data metal layer DTL1 and the second data metal layer DTL2. Also, a second passivation layer 152 may be additionally formed between the second data metal layer DTL2 and the planarization layer 160. The first passivation layer 151 and the second passivation layer 152 may be formed of an inorganic layer, for example, a silicon nitride layer, a silicon oxynitride layer, a silicon oxide layer, a titanium oxide layer, and/or an aluminum oxide layer.

Also in this embodiment, the scan write line GWL may be connected to each of the second connection electrode BE2 and the third connection electrode BE3. The second connection electrode BE2 may be connected to the gate electrode G1 of the first transistor ST1 that may be a part of the first gate connection electrode GBE1. Also, the third connection electrode BE3 may be connected to the gate electrode G3 of the third transistor ST3 that may be a part of the second gate connection electrode GBE2. Accordingly, an overlapping area between the gate electrode DT_G of the driving transistor DT and the scan write line GWL may not exist.

Accordingly, the parasitic capacitance Cb, which may occur between the gate electrode DT_G of the driving transistor DT and the scan write line GWL, may be prevented. The kickback voltage Vb due to the parasitic capacitance Cb in the gate electrode DT_G of the driving transistor DT may also be prevented. For example, in case that the driving current Ids is supplied to the light emitting element LE, the kickback voltage Vb may be prevented from affecting the gate electrode DT_G of the driving transistor DT by preventing the parasitic capacitance Cb. Accordingly, since the luminance of the light emitting element LE may be uniformly maintained among the sub-pixels SP, deterioration of image quality may be prevented.

Figure 20:
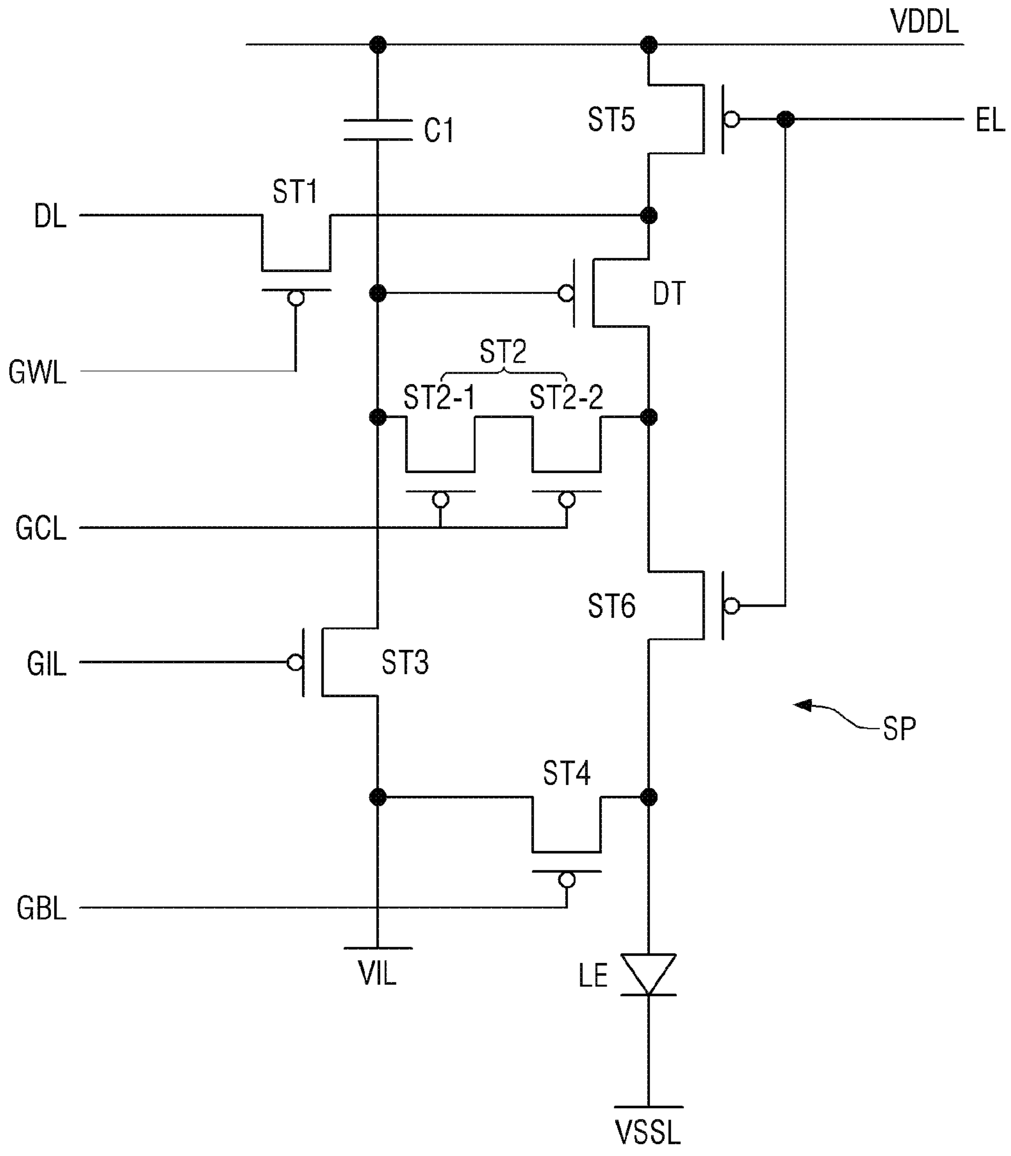
FIG. 20 is a schematic circuit diagram illustrating a sub-pixel according to still another embodiment.

FIG. 20 is a schematic circuit diagram illustrating a sub-pixel according to still another embodiment.

An embodiment of FIG. 20 may be substantially the same as an embodiment of FIGS. 9 to 17 except for a scan control line GCL, and thus the following description will be focused on differences from an embodiment of FIGS. 9 to 17.

Referring to FIG. 20, the sub-pixel SP may be connected to the scan initialization line GIL, the scan control line GCL, the scan write line GWL, the scan bias line GBL, and the data line DL. Further, the sub-pixel SP may be connected to the first driving voltage line VDDL to which the first driving voltage may be supplied, the initialization voltage line VIL to which the initialization voltage may be supplied, and the second driving voltage line VSSL to which the second driving voltage may be supplied.

The first transistor ST1 may be turned on by the scan signal of the scan write line GWL to connect the first electrode of the driving transistor DT to the data line DL. The gate electrode of the first transistor ST1 may be connected to the scan write line GWL, the first electrode thereof may be connected to the first electrode of the driving transistor DT, and the second electrode thereof may be connected to the data line DL.

The second transistor ST2 may be formed as a dual transistor including the second-first transistor ST2-1 and the second-second transistor ST2-2. The second-first transistor ST2-1 and the second-second transistor ST2-2 are turned on by the scan signal of the scan control line GCL to connect the gate electrode and the second electrode of the driving transistor DT. For example, in case that the second-first transistor ST2-1 and the second-second transistor ST2-2 are turned on, since the gate electrode and the second electrode of the driving transistor DT are connected, the driving transistor DT acts as a diode. The gate electrode of the second-first transistor ST2-1 may be connected to the scan control line GCL, and the first electrode thereof may be connected to the second electrode of the second-second transistor ST2-2, and the second electrode thereof may be connected to the gate electrode of the driving transistor DT. The gate electrode of the second-second transistor ST2-2 may be connected to the scan control line GCL, the first electrode thereof may be connected to the second electrode of the driving transistor DT, and the second electrode thereof may be connected to the first electrode of the second-second transistor ST2-2.

Figure 21:
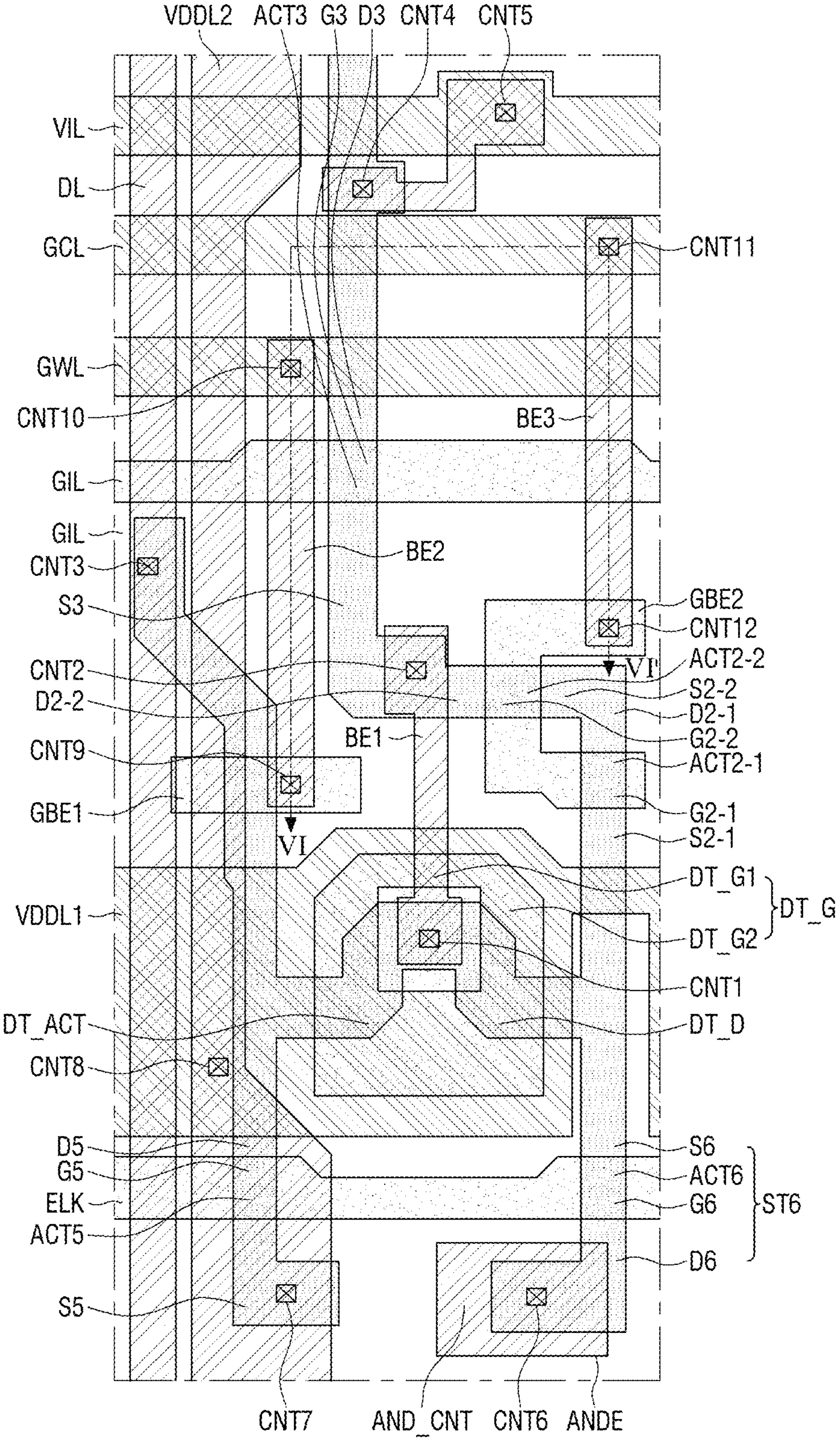
FIG. 21 is a schematic plan view illustrating a sub-pixel according to still another embodiment.
Figure 22:
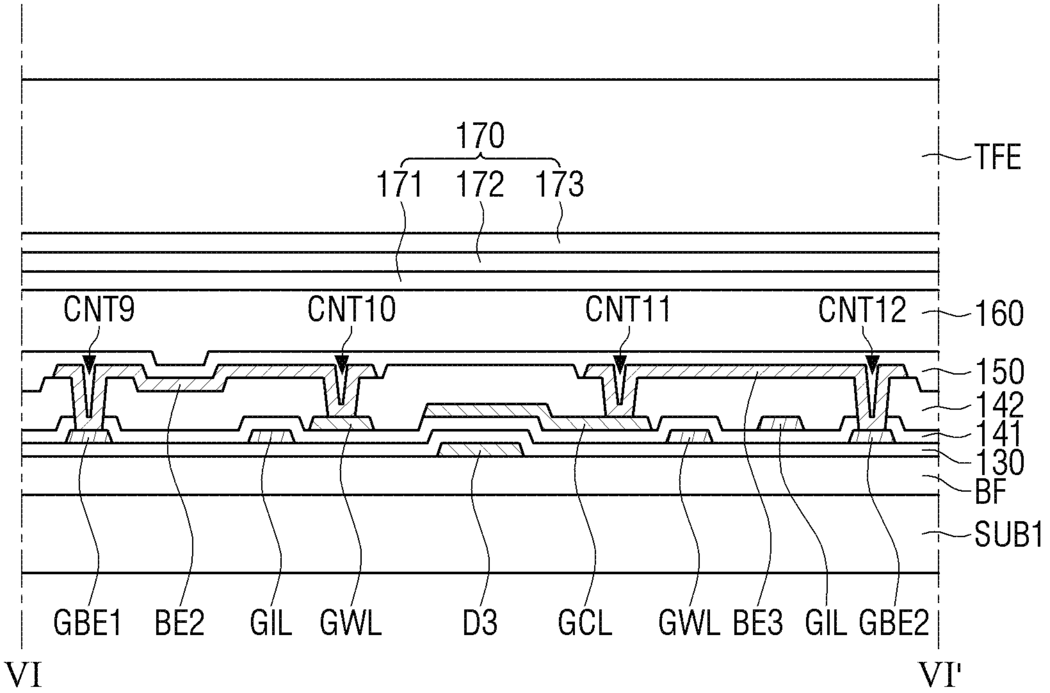
FIG. 22 is a schematic cross-sectional view illustrating an example taken along line VI-VI' of FIG. 21.

FIG. 21 is a schematic plan view illustrating a sub-pixel according to still another embodiment. FIG. 22 is a schematic cross-sectional view illustrating an example taken along line VI-VI' of FIG. 21.

In FIGS. 21 and 22, the second gate layer GTL2 disposed above the first gate layer GTL1 may further include the scan control line GCL.

The scan control line GCL may extend in the first direction (X-axis direction) together with the scan write line GWL and the initialization voltage line VIL. The scan control line GCL may be disposed between the scan write line GWL and the initialization voltage line VIL. The scan write line GWL, the scan control line GCL, and the initialization voltage line VIL may be sequentially disposed in the second direction (Y-axis direction).

The data metal layer DTL disposed above the second gate layer GTL2 may include the data line DL, the first driving voltage line VDDL, the first connection electrode BE1, the second connection electrode BE2, the third connection electrode BE3, the fourth connection electrode BE4, and the anode connection electrode ANDE of the light emitting element LE.

The third connection electrode BE3 may partially overlap each of the second gate connection electrode GBE2, the scan initialization line GIL, the scan write line GWL, and the scan control line GCL in the third direction (Z-axis direction). The third connection electrode BE3 may extend in the second direction (Y-axis direction).

Referring to FIGS. 21 and 22, the second gate layer GTL2 may be formed on the first interlayer insulating layer 141. The second gate layer GTL2 may include the initialization voltage line VIL and the first-first driving voltage line VDDL1. Further, the second gate layer GTL2 may include the scan write line GWL, and the scan control line GCL.

The second gate layer GTL2 may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

Further, the eleventh contact hole CNT11 may be a hole that penetrates the second interlayer insulating layer 142 to expose the scan control line GCL. The scan control line GCL may be connected to the third connection electrode BE3 through the eleventh contact hole CNT11.

In this embodiment, the scan write line GWL may be connected to the second connection electrode BE2 and the scan control line may be connected to the third connection electrode BE3. The second connection electrode BE2 may be connected to the gate electrode G1 of the first transistor ST1 that may be a part of the first gate connection electrode GBE1. Also, the third connection electrode BE3 may be connected to the gate electrode G3 of the third transistor ST3 that may be a part of the second gate connection electrode GBE2. Accordingly, an overlapping area between the gate electrode DT_G of the driving transistor DT and the scan write line GWL may not exist.

Accordingly, the parasitic capacitance Cb, which may occur between the gate electrode DT_G of the driving transistor DT and the scan write line GWL, may be prevented. Therefore, in case that the driving current Ids is supplied to the light emitting element LE, the kickback voltage Vb may be prevented from affecting the gate electrode DT_G of the driving transistor DT by preventing the parasitic capacitance Cb. Since the luminance of the light emitting element LE may be uniformly maintained among the sub-pixels SP, deterioration of image quality may be prevented.

In concluding the detailed description, those skilled in the art will appreciate that many variations and modifications can be made to embodiments without substantially departing from the principles of the disclosure. Therefore, the disclosed embodiments of the disclosure are used in a generic and descriptive sense only and not for purposes of limitation.

What is claimed is:

1. A display device comprising:

a scan write line extending in a first direction;

a data line extending in a second direction perpendicular to the first direction;

a driving transistor configured to provide a driving current flowing from a first electrode to a second electrode according to a voltage of a gate electrode;

a first transistor configured to connect the data line and the first electrode of the driving transistor according to a scan write signal of the scan write line;

a second transistor configured to connect the gate electrode and the second electrode of the driving transistor according to the scan write signal of the scan write line;

a first connection electrode electrically connected to the gate electrode of the driving transistor;

a first gate connection electrode including a gate electrode of the first transistor and electrically connected to the scan write line; and a second gate connection electrode including a gate electrode of the second transistor and electrically connected to the scan write line, wherein the first connection electrode is between the first gate connection electrode and the second gate connection electrode in the first direction, and the first gate connection electrode being part of a different layer than the scan write line.

2. The display device of claim 1, wherein the first connection electrode extends in the second direction, and the first gate connection electrode has a longest dimension that extends in the first direction.

3. The display device of claim 1, wherein the first gate connection electrode, the first connection electrode and the second gate connection electrode do not overlap the data line, and the first gate connection electrode and the second connection electrode are included to eliminate parasitic capacitance between the first connection electrode and the scan write line by preventing the first connection electrode from overlapping the scan write line in a plan view.

4. The display device of claim 1, further comprising:

a driving voltage line extending in the second direction, wherein the first gate connection electrode overlaps the driving voltage line.

5. The display device of claim 4, wherein the first connection electrode and the second gate connection electrode do not overlap the driving voltage line.

6. The display device of claim 1, further comprising:

a second connection electrode connected to the first gate connection electrode and the scan write line; and a third connection electrode connected to the second gate electrode and the scan write line.

7. The display device of claim 6, wherein the first connection electrode, the second connection electrode and the third connection electrode include a same material.

8. The display device of claim 6, wherein each of the second connection electrode and the third connection electrode extends in the second direction.

9. The display device of claim 8, wherein a length of the first connection electrode in the second direction is smaller than a length of the second connection electrode in the second direction.

10. The display device of claim 8, wherein a length of the second connection electrode in the second direction is smaller than a length of the third connection electrode in the second direction.

11. The display device of claim 6, further comprising:

a scan initialization line extending in the first direction, wherein each of the second connection electrode and the third connection electrode overlaps the scan initialization line.

12. The display device of claim 11, wherein the first connection electrode does not overlap the scan initialization line.

13. The display device of claim 11, wherein a minimum distance between the scan write line and the first connection line is greater than a minimum distance between the scan initialization line and the first connection line.

14. The display device of claim 11, further comprising:
an initialization voltage line extending in the first direction; and
a third transistor configured to connect the gate electrode and the initialization voltage line according to a scan initialization signal of the scan initialization line.

15. The display device of claim 14, wherein the scan write line is between the initialization voltage line and the scan initialization line in the second direction.

16. The display device of claim 14, wherein a minimum distance between the scan write line and the first connection line is smaller than a minimum distance between the initialization voltage line and the first connection line.

17. The display device of claim 14, wherein a minimum distance between the scan initialization line and the first connection line is smaller than a minimum distance between the initialization voltage line and the first connection line.

18. The display device of claim 1, wherein the first connection electrode and the scan write line do not overlap in a thickness direction of the display device.

19. The display device of claim 6, wherein the first connection electrode is between the second connection electrode and the third connection electrode in the first direction.

20. The display device of claim 6, wherein the second connection electrode, the third connection electrode and the scan write line include a same material.

21. A display device comprising:
a scan write line extending in a first direction;
a data line extending in a second direction perpendicular to the first direction;
a driving voltage line extending in the second direction and space apart from the data line;
a driving transistor configured to provide a driving current flowing from a first electrode to a second electrode according to a voltage of a gate electrode;
a first transistor configured to connect the data line and the first electrode of the driving transistor according to a scan write signal of the scan write line; and
a first gate connection electrode including a gate electrode of the first transistor and electrically connected to the scan write line,
wherein the first gate connection electrode overlaps the driving voltage line.

22. The display device of claim 21, wherein the first gate connection electrode extends in the first direction.

23. The display device of claim 21, further comprising:
a first connection electrode electrically connected to the gate electrode of the driving transistor; and
a second connection electrode connected to the first gate connection electrode and the scan write line.

24. The display device of claim 23, wherein the first connection electrode and the second connection electrode include a same material.

25. The display device of claim 23, wherein the first gate connection electrode, the first connection electrode, and the first gate connection electrode do not overlap the data line.

26. The display device of claim 23, further comprising:
a second transistor configured to connect the gate electrode and the second electrode of the driving transistor according to the scan write signal of the scan write line;
a second gate connection electrode including a gate electrode of the second transistor and electrically connected to the scan write line; and
a third connection electrode connected to the second gate electrode and the scan write line.

27. The display device of claim 26, wherein the first connection electrode is between the first gate connection electrode and the second gate connection electrode in the first direction.

28. The display device of claim 26, wherein the first connection electrode, the second connection electrode and the third connection electrode include a same material.

29. The display device of claim 26, wherein each of the first connection electrode, the second connection electrode, and the third connection electrode extends in the second direction.

30. An electronic device comprising:
a display device for providing an image,
wherein the display device comprises:
a scan write line extending in a first direction;
a data line extending in a second direction perpendicular to the first direction;
a driving transistor configured to provide a driving current flowing from a first electrode to a second electrode according to a voltage of a gate electrode;
a first transistor configured to connect the data line and the first electrode of the driving transistor according to a scan write signal of the scan write line;
a second transistor configured to connect the gate electrode and the second electrode of the driving transistor according to the scan write signal of the scan write line;
a first connection electrode electrically connected to the gate electrode of the driving transistor;
a first gate connection electrode including a gate electrode of the first transistor and electrically connected to the scan write line; and
a second gate connection electrode including a gate electrode of the second transistor and electrically connected to the scan write line, wherein
the first connection electrode is between the first gate connection electrode and the second gate connection electrode in the first direction,
the first gate connection electrode and the second gate connection electrode are formed from a same laver, and
the first gate connection electrode being part of a different layer than the scan write line.

* * * * *